United States Patent
Flamini et al.

(10) Patent No.: US 10,700,958 B2
(45) Date of Patent: Jun. 30, 2020

(54) NETWORK MANAGEMENT SYSTEM WITH TRAFFIC ENGINEERING FOR A SOFTWARE DEFINED NETWORK

(71) Applicant: Neutrona Networks International LLC, Miami, FL (US)

(72) Inventors: David Alonso Flamini, Ciudad de Buenos Aires (AR); Luciano Salata, Aventura, FL (US); Mateo Dylan Ward, Miami, FL (US); Daniel Omar Monetto, Ciudad de Buenos Aires (AR); Jorge Martin Urriste, Ciudad de Buenos Aires (AR)

(73) Assignee: NEUTRONA NETWORKS INTERNATIONAL LLC, Miami, FL (US)

( * ) Notice: Subject to any disclaimer, the term of this patent is extended or adjusted under 35 U.S.C. 154(b) by 152 days.

(21) Appl. No.: 15/563,915

(22) PCT Filed: Mar. 31, 2016

(86) PCT No.: PCT/US2016/025288
§ 371 (c)(1),
(2) Date: Oct. 2, 2017

(87) PCT Pub. No.: WO2016/161127
PCT Pub. Date: Oct. 6, 2016

(65) Prior Publication Data
US 2018/0123941 A1 May 3, 2018

Related U.S. Application Data

(60) Provisional application No. 62/141,557, filed on Apr. 1, 2015.

(51) Int. Cl.
*H04L 12/24* (2006.01)
*H04L 12/751* (2013.01)
(Continued)

(52) U.S. Cl.
CPC ............ *H04L 45/02* (2013.01); *H04L 41/082* (2013.01); *H04L 41/0806* (2013.01);
(Continued)

(58) Field of Classification Search
CPC ......... H04L 12/00; H04L 12/28; H04L 12/46; H04L 29/00–04; H04L 41/00;
(Continued)

(56) References Cited

U.S. PATENT DOCUMENTS 6,069,895 A * 5/2000 Ayandeh ................. H04L 45/02
370/389
6,963,916 B1 * 11/2005 Pugaczewski ...... H04L 41/0806
709/218

(Continued)

OTHER PUBLICATIONS

Paul Goransson et al: "Software Defined Networks : A Comprehensive Approach" In: "Software Defined Networks: A Comprehensive Approach", Jun. 30, 2014 (Jun. 30, 2014), Morgan Kaufmann, pp. 59-79, 81-93, 169-178, and 235-237.

(Continued)

*Primary Examiner* — Arvin Eskandarnia
*Assistant Examiner* — Boris D Grijalva Lobos
(74) *Attorney, Agent, or Firm* — Katten Muchin Rosenman LLP

(57) ABSTRACT

A method for managing one or more class levels of service between a communication network and one or more other networks, including retrieving network information of network devices in the communication network; generating a customizable traffic engineering database based on the retrieved network information; receiving user input of path computation parameters; generating path information corresponding to optimal paths for a subset of the network devices; validating the generated path information; generating path configuration information based on the validated path information; transmitting the path configuration infor- (Continued)

mation to one or more of the network devices; generating an external service model comprising plural exit points for connecting to points of presence of the communication network corresponding to the path configuration information; and interconnecting the communication network with the one or more other networks on the one or more class levels of service through the plural exit points.

12 Claims, 24 Drawing Sheets

(51) Int. Cl.
   *H04L 12/725* (2013.01)
   *H04L 12/715* (2013.01)
   *H04L 12/721* (2013.01)
(52) U.S. Cl.
   CPC .......... *H04L 41/12* (2013.01); *H04L 41/5003* (2013.01); *H04L 45/124* (2013.01); *H04L 45/302* (2013.01); *H04L 45/64* (2013.01)
(58) Field of Classification Search
   CPC ......... H04L 41/08–0806; H04L 41/082; H04L 41/0823–0836; H04L 41/085; H04L 41/0853; H04L 41/12; H04L 41/50; H04L 41/5003; H04L 45/00; H04L 45/02; H04L 45/12–1287; H04L 45/24; H04L 45/302–306; H04L 45/64
   See application file for complete search history.

(56) References Cited

U.S. PATENT DOCUMENTS

| | | | | |
|---|---|---|---|---|
| 7,581,022 B1* | 8/2009 | Griffin | ............ | H04L 45/04 370/238 |
| 7,904,586 B1* | 3/2011 | Griffin | ............ | H04L 45/00 709/238 |
| 8,040,808 B1* | 10/2011 | Kasturi | ............ | H04L 45/00 370/238 |
| 8,296,459 B1 | 10/2012 | Brandwine et al. | | |
| 8,416,709 B1* | 4/2013 | Marshall | ............ | H04L 41/0806 370/252 |
| 8,537,840 B1* | 9/2013 | Raszuk | ............ | H04L 45/04 370/351 |
| 8,570,897 B2* | 10/2013 | Flinta | ............ | H04L 45/04 370/254 |
| 8,583,467 B1* | 11/2013 | Morris | ............ | G06Q 10/06 705/7.26 |
| 8,787,154 B1* | 7/2014 | Medved | ............ | H04L 45/64 370/225 |
| 8,797,844 B1* | 8/2014 | Strahle | ............ | H04L 45/28 370/219 |
| 8,949,394 B1* | 2/2015 | Papagiannaki | ....... | H04L 41/147 709/223 |
| 8,989,199 B1 | 3/2015 | Sella et al. | | |
| 9,087,319 B2* | 7/2015 | Nguyen | ............ | G06Q 10/10 |
| 9,306,870 B1* | 4/2016 | Klein | ............ | H04L 29/06176 |
| 9,699,502 B1* | 7/2017 | Sandholm | ............ | H04N 21/442 |
| 9,755,946 B2* | 9/2017 | Farris | ............ | H04L 45/02 |
| 9,858,559 B2* | 1/2018 | Raleigh | ............ | G06Q 20/145 |
| 2002/0071389 A1* | 6/2002 | Seo | ............ | H04L 45/00 370/232 |
| 2003/0039212 A1* | 2/2003 | Lloyd | ............ | H04L 41/0823 370/235 |
| 2003/0058798 A1* | 3/2003 | Fleischer | ............ | H04L 45/00 370/238 |
| 2003/0137983 A1* | 7/2003 | Song | ............ | H04L 45/00 370/395.4 |
| 2004/0202159 A1* | 10/2004 | Matsubara | ............ | H04L 45/04 370/389 |
| 2006/0182034 A1* | 8/2006 | Klinker | ............ | H04L 43/00 370/238 |
| 2008/0225751 A1* | 9/2008 | Kozat | ............ | H04L 12/1881 370/254 |
| 2008/0279155 A1* | 11/2008 | Pratt, Jr. | ............ | H04L 12/66 370/336 |
| 2010/0128703 A1* | 5/2010 | Brand | ............ | H04L 45/121 370/338 |
| 2011/0296051 A1* | 12/2011 | Vange | ............ | H04L 41/12 709/238 |
| 2012/0087368 A1 | 4/2012 | Kunarathnam et al. | | |
| 2013/0205029 A1* | 8/2013 | Taylor | ............ | H04L 12/5691 709/226 |
| 2014/0105005 A1* | 4/2014 | Agrawal | ............ | H04L 41/0803 370/230 |
| 2015/0131444 A1* | 5/2015 | Malatack | ............ | H04L 47/125 370/235 |
| 2015/0264135 A1* | 9/2015 | Kandula | ............ | H04L 67/1095 709/204 |
| 2016/0094398 A1* | 3/2016 | Choudhury | ............ | H04L 45/42 370/254 |
| 2016/0191391 A1* | 6/2016 | Wood | ............ | H04L 47/125 370/235 |
| 2016/0248658 A1* | 8/2016 | Patel | ............ | H04L 45/02 |

OTHER PUBLICATIONS

"Software Defined Networking: The New Norms for Networks", Open Networking Foundation (OFN), OFN White Paper, Apr. 13, 2012, Retrieved from the Internet: <URL:http://www.opennetworking.org/images/stories/downloads/sdn-resources/white-papers/wp-sdn-newnorm.pdf>.

International Search Report and the Written Opinion of the International Searching Authority for International Application No. PCT/US2016/025288 dated Jan. 7, 2016.

* cited by examiner

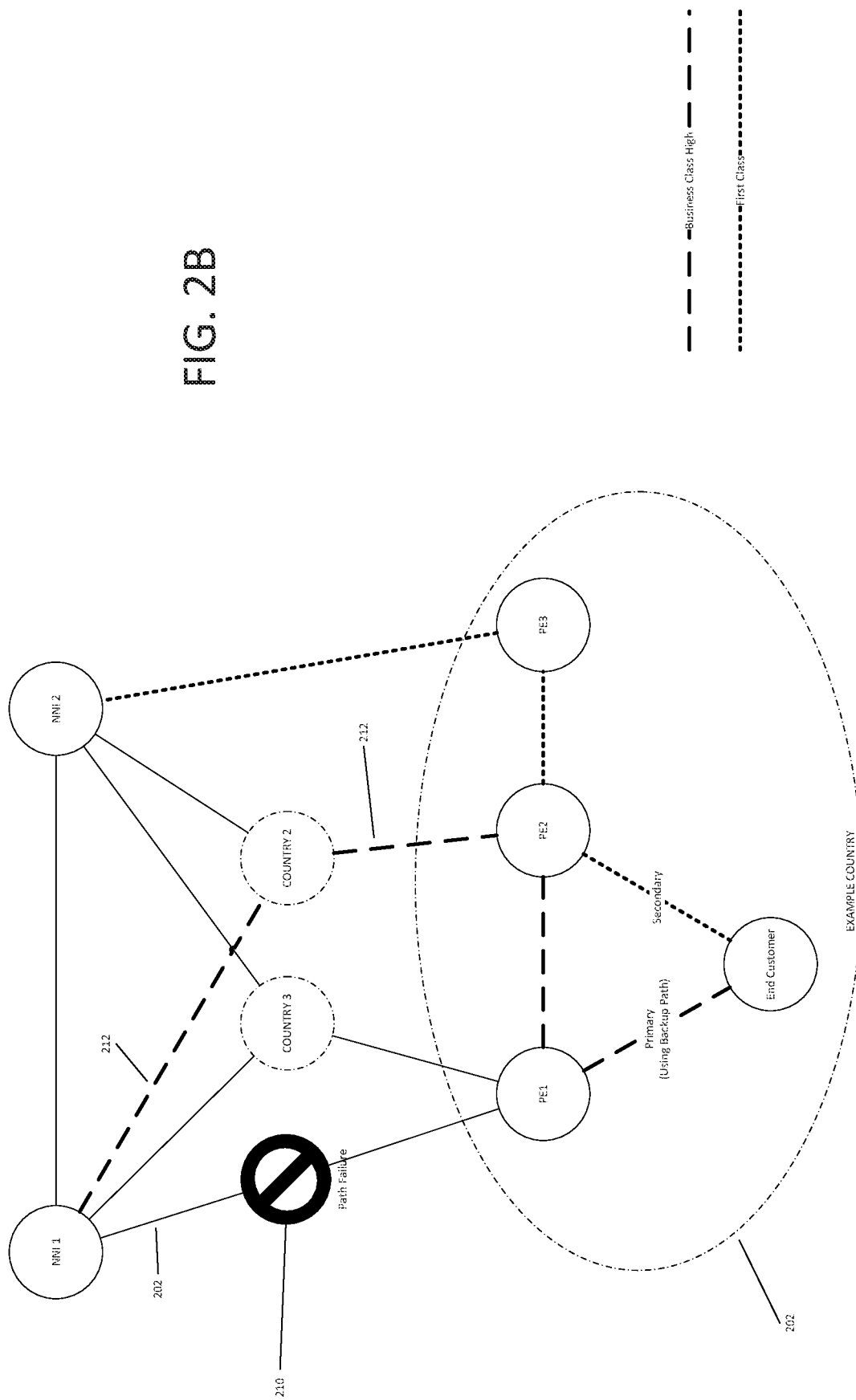

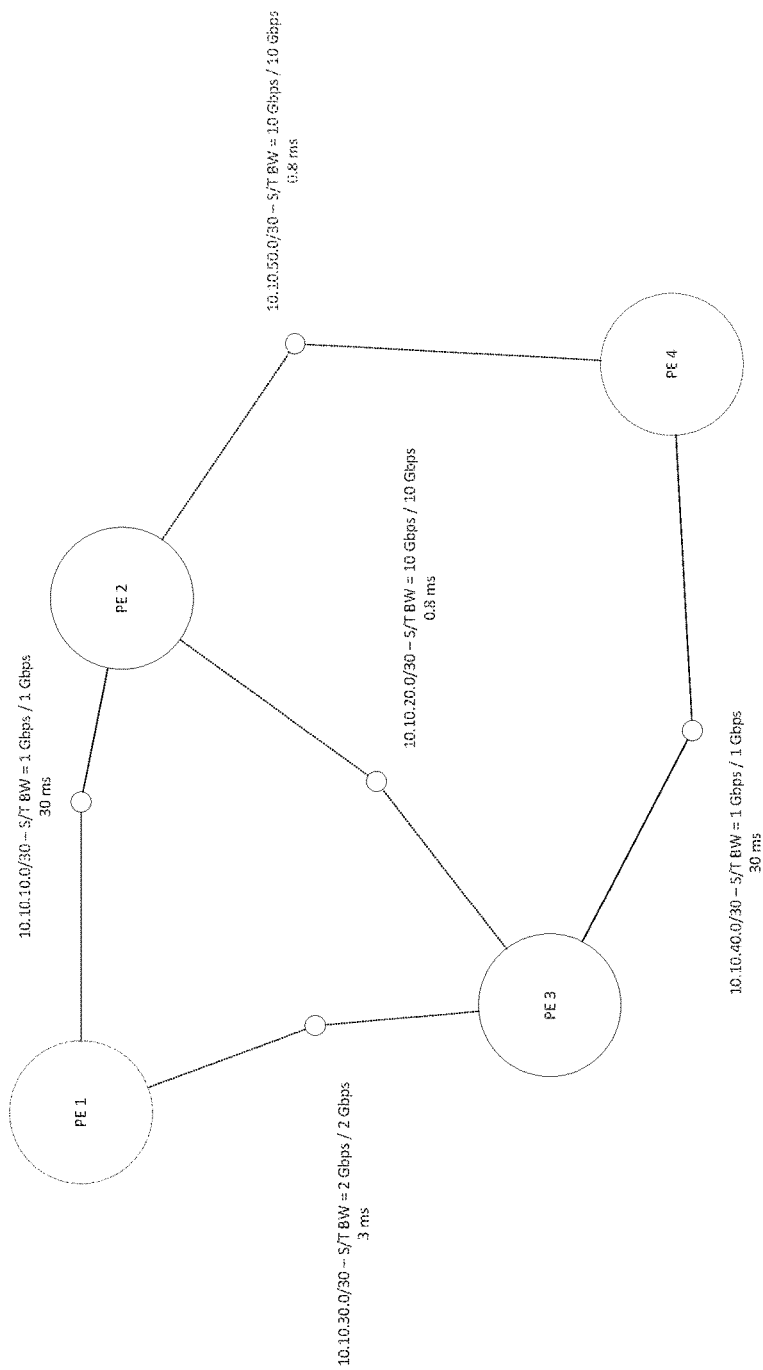
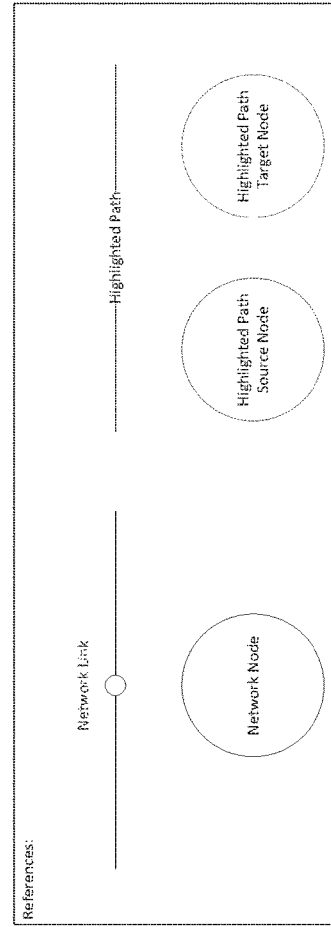
FIG. 5

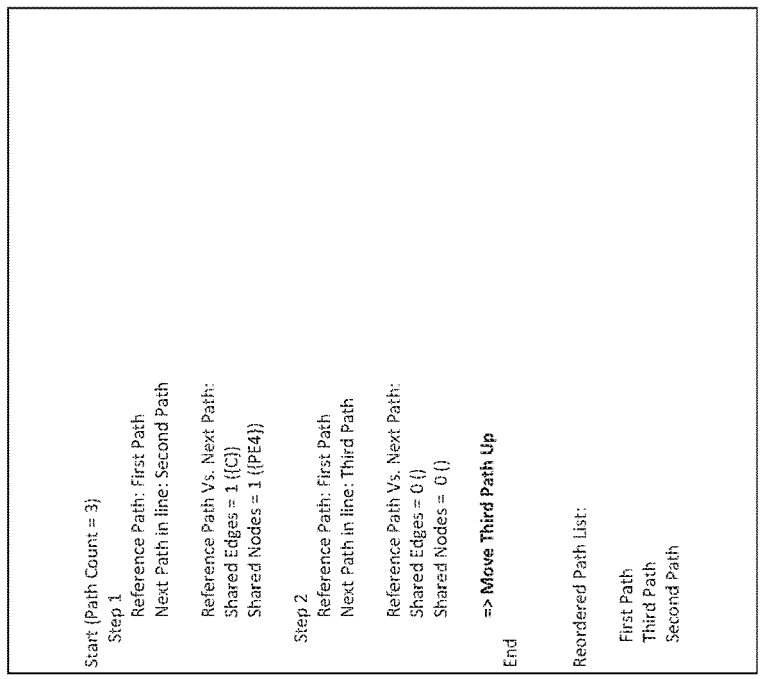
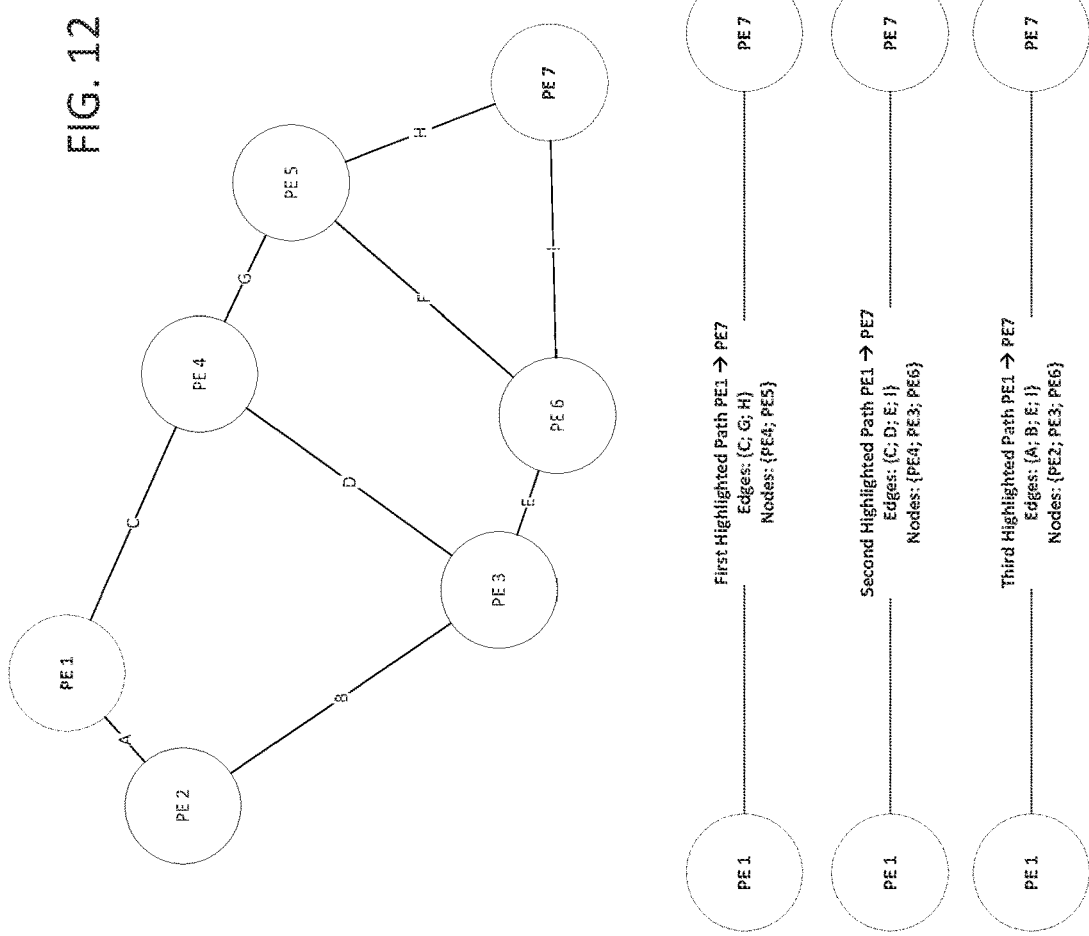
FIG. 12

FIG. 14
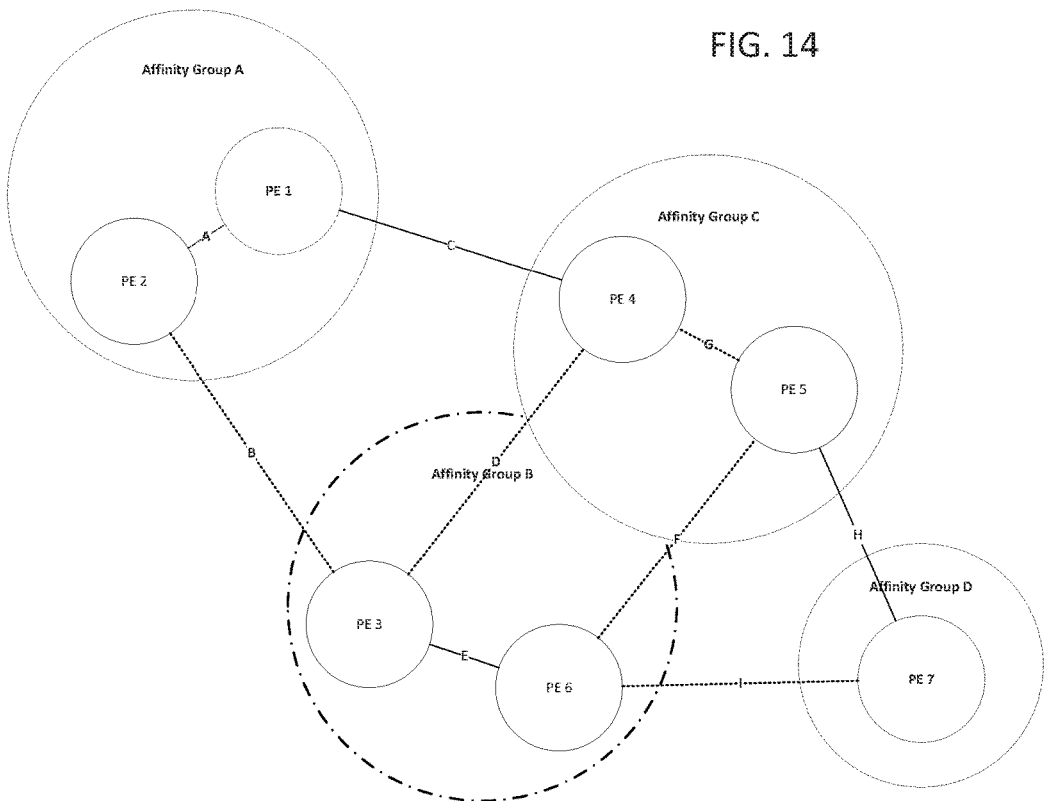
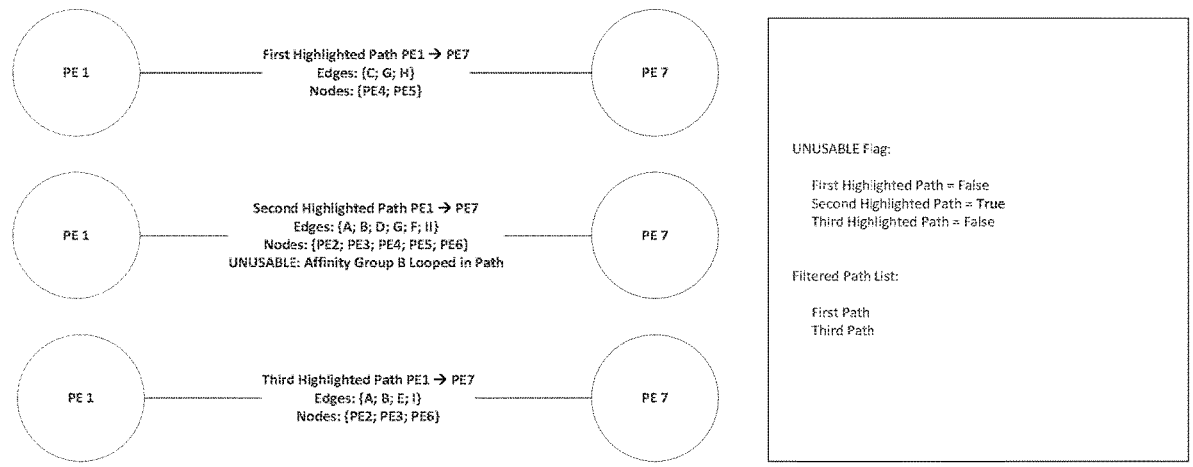

NETWORK MANAGEMENT SYSTEM WITH TRAFFIC ENGINEERING FOR A SOFTWARE DEFINED NETWORK

FIELD

The present invention is directed to a network management technique, and particularly, to providing path modeling, automated traffic engineering, and network configuration per service type and specific business rules to a communication network.

BACKGROUND

With the continuing development of globally interconnected communication networks, a need has arisen for robust interconnection amongst communication networks servicing respective regions and entities. In traditional network operation practices, network level modeling can become very complex due to the number of paths that have to be calculated and installed on the network to be able to deploy multiple service types in terms of routes.

Providing multiple redundant, bandwidth efficient paths over a data network ensuring traffic handling behavior is predictable is a challenge for network operators. Usually the solution is throwing more bandwidth at the problem, but this has its inherent drawbacks and sometimes it is actually not possible to increase bandwidth capacity right away for a number of reasons. Building, operating and maintaining a backbone network requires a large amount of money and time invested not only in hardware and software but in planning and deploying its components, then it is imperative to efficiently manage the network resources to ensure the investment is effectively returned within the expected timeframe and margin. On the other hand squeezing too much the networks resources could lead to improper traffic handling, data loss, instability and ultimately impacting negatively the service level and customer experience.

A way to effectively manage both capacity and traffic is needed, or else it would not be possible to provide a highest quality service at a fair price. To meet that goal, it is needed not only to centralize network intelligence separating the control plane from the data plane but bringing the business plane into the equation.

As an example, a Path Count Calculation for a given partially-meshed Network, designed in terms of link count and topology to accommodate an Average Number of 3 Paths per Service Type, with 4 Service Types over a Network with 25 nodes, results in 7200 possible Paths.

SUMMARY

In view of the above, it is an object of the invention to provide intelligent and automated traffic engineering within and between communication networks.

Traditionally, IP/MPLS networks rely on a distributed control plane, comprised by the routers that make up the network, the separation from control plane and data plane takes place at these boxes, where different pieces of hardware are in charge of running each function coordinately; the distributed control plane has a partial view of the network, from the point of view of each router. Technologies like Software Defined Networking (SDN) require to have a broader, global view of the network to actually be able to implement the so-called centralized control plane but they still need the nodes to communicate between each other and provide the link state information used to generate the graph that represents the network, then in fact the distributed control plane does not disappear, the network still relies on it to run the traditional routing protocols that provide cohesion and basic routing information.

A hybrid methodology computing the paths from a centralized control plane, relying on a distributed control plane for real time routing decisions ultimately bringing programmability to the data plane and using network resources more efficiently could be a fairly elegant answer to integrating both traditional and innovative control plane models.

With this in mind, the network level model is extended to interface with an abstraction layer capable of representing the whole network as a graph by retrieving live information and network topology, then model the paths based on multiple business rules, classes of service, and algorithms and finally push the calculated paths back to the network for installation.

BRIEF DESCRIPTION OF DRAWINGS

FIGS. 2A, 2B, 2C, and 2D are network diagrams illustrating path failure scenarios for an exemplary service type to an example country;

FIG. 5 illustrates a graphical representation of a Customized Traffic Engineering Database (C-TED) in accordance with an embodiment of the invention.

FIG. 12 illustrates a scenario in implementing a Diversity Ordering Routine according to an exemplary embodiment of the invention.

FIG. 14 illustrates a scenario in implementing a Discard Unusable Pruning Routine according to an exemplary embodiment of the invention.

DESCRIPTION OF EMBODIMENTS

In accordance with an exemplary embodiment of the invention, a communication network, such as a wide area network ("WAN"), may comprise plural network entities (e.g., switches, routers, and the like), each of which may be embodied by one or more computing apparatuses (e.g., a computer having one or more processors, a memory and/or a storage medium, an input/output interface, a communication bus, and one or more network interfaces, which may be in the form of a network server apparatus, a relay apparatus such as a switch or a router, a personal computer, a mobile terminal, etc.), that are interconnected to form the communication network. In some cases, a communication network may correspond to a geographical area, such as a metropolitan area, a region, a country, and the like, with one or more entities, such as network service providers, responsible for the provision and management of interconnection with the communication network.

Figure 1:
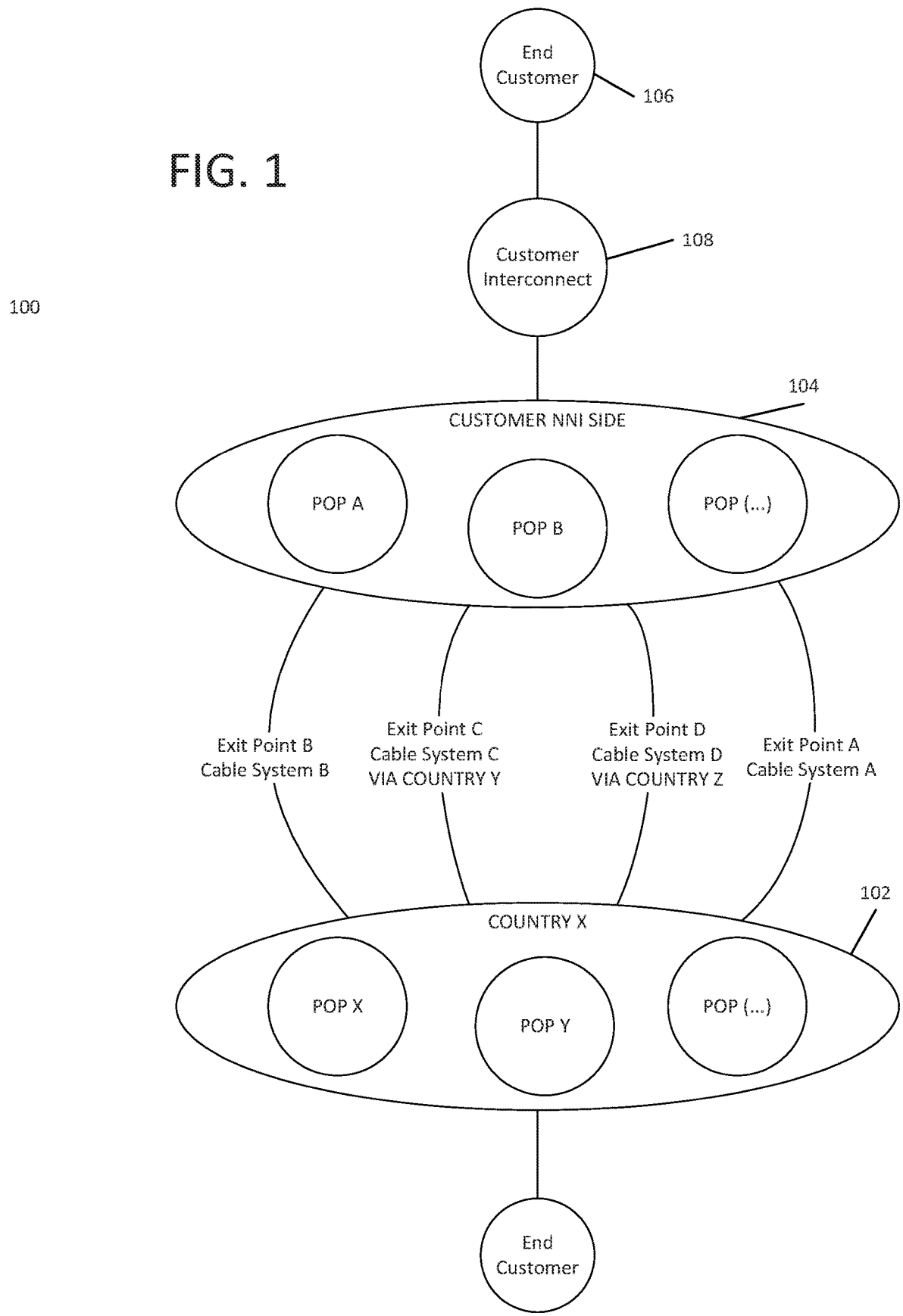
FIG. 1 is a diagram illustrating interconnection between communication networks serving end customers in accordance with an embodiment of the invention.

FIG. 1 illustrates an exemplary communication network 100 and connections embodying access thereto in accordance with an embodiment of the invention. As shown in FIG. 1, a communication network 100 may correspond to a country X 102, which comprises points of presence ("POP"s) X, Y, etc. for providing connectivity to and serving an end customer. Access to country X 102 and its POPs may be provided to a customer network entity (or network service provider) embodied by a corresponding network-to-network interface ("NNI") 104 comprising POPs A, B, C, etc. The customer NNI 104 may provide connectivity and services to end customers 106 via a customer interconnect 108. And as shown in FIG. 1, the access to country X 102 may be provided to the customer network entity via Exit Points A-D through corresponding Cable Systems A-D. As an example, Exit Points C and D may be provided through Cable Systems C and D of countries Y and Z, respectively.

Access to a communication network 100, such as country X 102 shown in FIG. 1, may be defined using a service type and customer classification.

The service type may define the nature of a service, for example, in terms of bandwidth range, redundancy strategy, route preference, path diversification, and the like. And the customer or service classification may directly relate to traffic handling for each Service Type in normal and contingency situations, depending upon service type, POP and traffic path.

Different types of customers may be classified according to a framework without a direct dependency between the customer or service classification and service type, giving flexibility to the solution. The customer classification may differentiate traffic handling for service types in three classes: First Class, Business Class, and Coach Class, in that order of priority. Business rules corresponding to these service types may be implemented seamlessly, as described in further detail below.

A traffic set comprised of the aggregated traffic flows classified as First Class should never compete with Business or Coach Class traffic belonging to a different traffic set; the same behavior applies for Business vs. Coach Classes. Therefore, each class has a different queue assignment.

The network paths are not tied to the customer classification schema to allow for flexibility and custom solutions (e.g. Customers requesting more than four traffic handling profiles). Lower class queue sharing may occur in some cases.

Hardware queues in communication devices are usually a fixed, finite resource. As most carrier class equipment sports 8 queues per port or interface, it may be assumed that that amount of queues is available for use. Also, the EXP field in the MPLS header commonly used for traffic classification is only 3 bits long, therefore giving 8 different possible values. In view of these limitations, an exemplary queuing schema is provided below. Use of a different number of queues per port or bits EXP field would allow for either additional or fewer classes, sub-classes, and queue assignments.

Queuing Schema Example:

TABLE 1

| Class | Sub Class | Queue Assignment |
| --- | --- | --- |
| Network Control (reserved for control plane traffic) | | Q7 |
| First Class | Real Time | Q6 |
| | Premium | Q5 |
| | High | Q4 |
| | Standard | Q3 |
| Business Class | High | Q2 |
| | Standard | Q1 |
| Coach Class | Best Effort | Q0 |

Referring back to FIG. 1, with the objective of modeling the service transport paths, an Exit Point is defined as a link through which the points of presence ("POP"s) can be reached, where interconnection to country X—and through to an End Customer attached to the POP—is provided to a customer network entity. Each and every country should have at least two exit points over different cable systems. The Exit Point role selection is based on constraints defined by multiple variables: monetary cost, reliability, delay, packet loss, etc. A route matrix based on the same constraints may be defined in order to provide optimal paths for traffic within a region comprising one or more of the countries.

Exit Points are identified by tagging the corresponding interfaces on the network devices with administrative groups assigned to the different service types, this way the traditional network model is extended and the Exit Point definition is hardcoded on the devices configuration. The same concept can be used to take path computation decisions (i.e. except a link for a given Service Type, identify Exit Points per Point of Presence Affinity Group, etc.).

Example: Exit Point Tagging
Node: PE1
Interface A—administrative groups: SERVICE-TYPE-1-PRIMARY, SERVICE-TYPE-2-SECONDARY
Interface B—administrative groups: SERVICE-TYPE-1-SECONDARY, SERVICE-TYPE-2-PRIMARY
Interface C—administrative groups: SERVICE-TYPE-1-TERTIARY, TRANSIT-EXCEPT-TYPE-2

The Exit Point role selection and usage may be based on constraints defined by multiple business and network variables: bandwidth, monetary cost, reliability, delay, packet loss, destination Affinity Group, etc. A route matrix based on the same constraints may be defined or computed in order to provide optimal paths within a subset of the network.

The Exit Point Roles may prove useful in scenarios where the services are run mostly in a hub-and-spoke topology (i.e. delivered from a multiple Points of Presence towards a single Affinity Group).

Points of Presence within the same geographical region sharing low delay links (e.g. POPs within the same country)

may be grouped under a single affinity denomination. As routes may traverse multiple Points of Presence to reach a given destination, Affinity Groups shall be used to optimize routing calculations. PoP Affinity Groups may be assigned based on multiple existing parameters (e.g. hostname and/or addresses).

Again, the service types that may be provided to a customer network entity may be defined using an interconnection circuit through a corresponding Cable System, as illustrated in FIG. 1.

FIGS. 2A-2D illustrate an exemplary service type provided to a customer network entity. Each of these figures illustrate scenarios for addressing particular path failures for the illustrated service type.

In particular, FIGS. 2A-2D illustrate a service type 1 for providing interconnection to an example country.

Service Type 1

Two circuits (A&B). Circuit A: active, Circuit B: backup. Backup circuit is still up and enabled to forward traffic at all times. The customer can choose through which circuit to send its traffic alternatively. It is not expected that both circuits will be forwarding traffic at the same time. Therefore, this allows for some room to work with lower service classes in the networking world (allowing lower queues to take over unused capacity of higher queues momentarily and shrink back in case those higher queues need more of their previously assigned or reserved bandwidth). Services A & B will usually be attached to different Points of Presence belonging to the same Affinity Group.

Primary Route(s):
Circuit A: Cable System A—First Class
Circuit B: Cable System B—First Class
  Backup Route for both Circuits, if available:
Cable System C—Business Class High
Cable System D—Business Class High
If a third route is not available then they will fall over from Cable System A to Cable System B and vice versa unless a different solution is requested by the Customer.

Alternative service types may include the following:
  Service Type 2
Just one circuit.
  Primary Route(s):
Cable System A—First Class
  Backup Route:
Cable System B—Business Class Low
Cable System C—Business Class Low, if available.
  Service Type 3
Just one circuit.
  Primary Route(s):
Cable System A—First Class
  Backup Route:
Cable System B—Coach Class
Cable System C—Coach Class, if available.
  Service Type 4 (Internet)
Dedicated Internet Access. IP Transit.
  Primary Route(s):
Cable System A—Business Class Low
  Backup Route:
Cable System B—Coach Class
Cable System C—Coach Class, if available.

In the case that more than 3 cable systems are available, more than 3 routes may be used for a given service type.

As an example, a customer network entity may require that traffic not to be rerouted over a backup path if a given Cable System is not available. In such a case, the service may be classified as type 1, 2, 3 or 4, and flagged as a custom solution, where the service is tuned as requested.

Figure 2A:
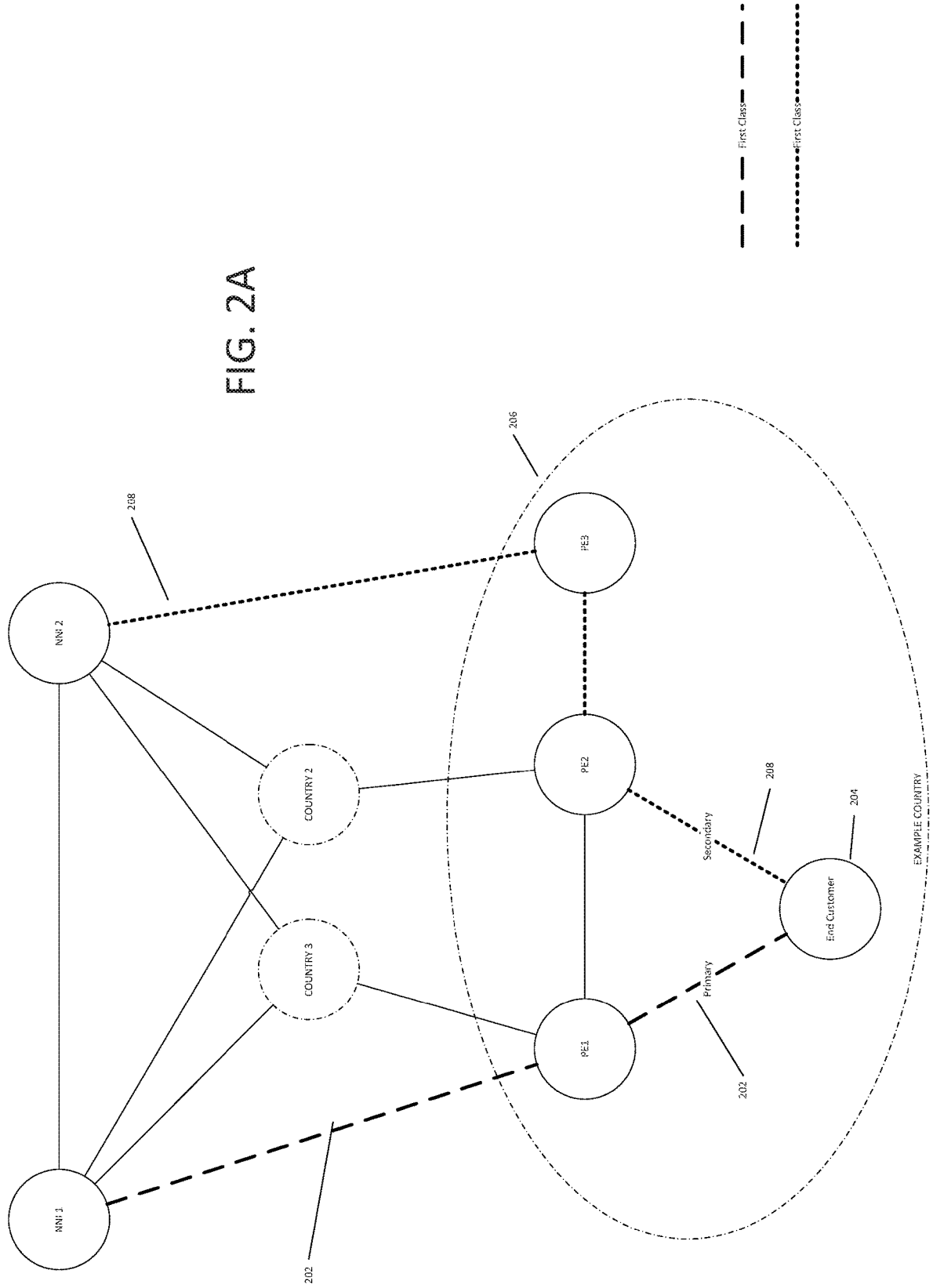
Figure 2C:
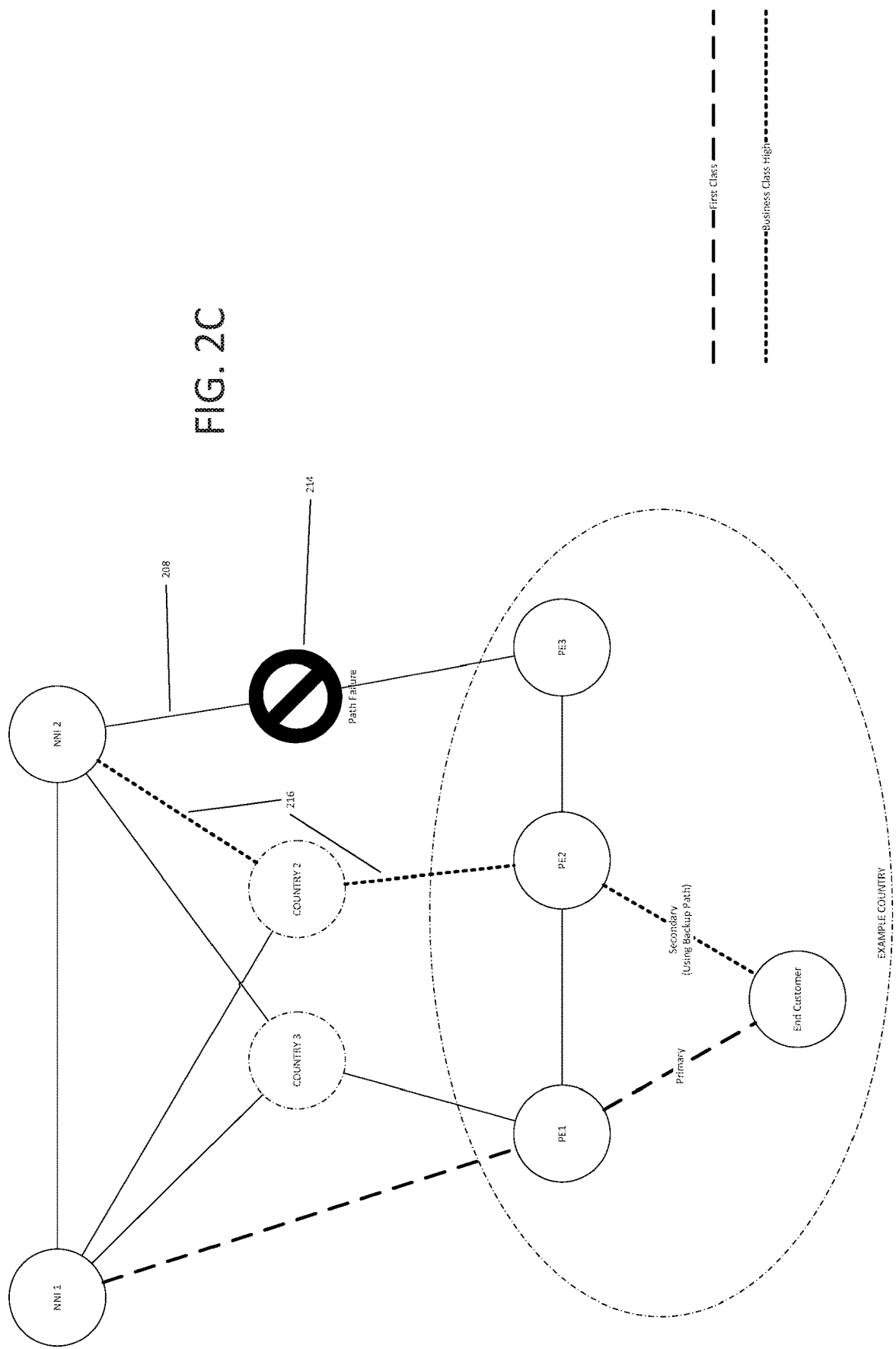
Figure 2D:
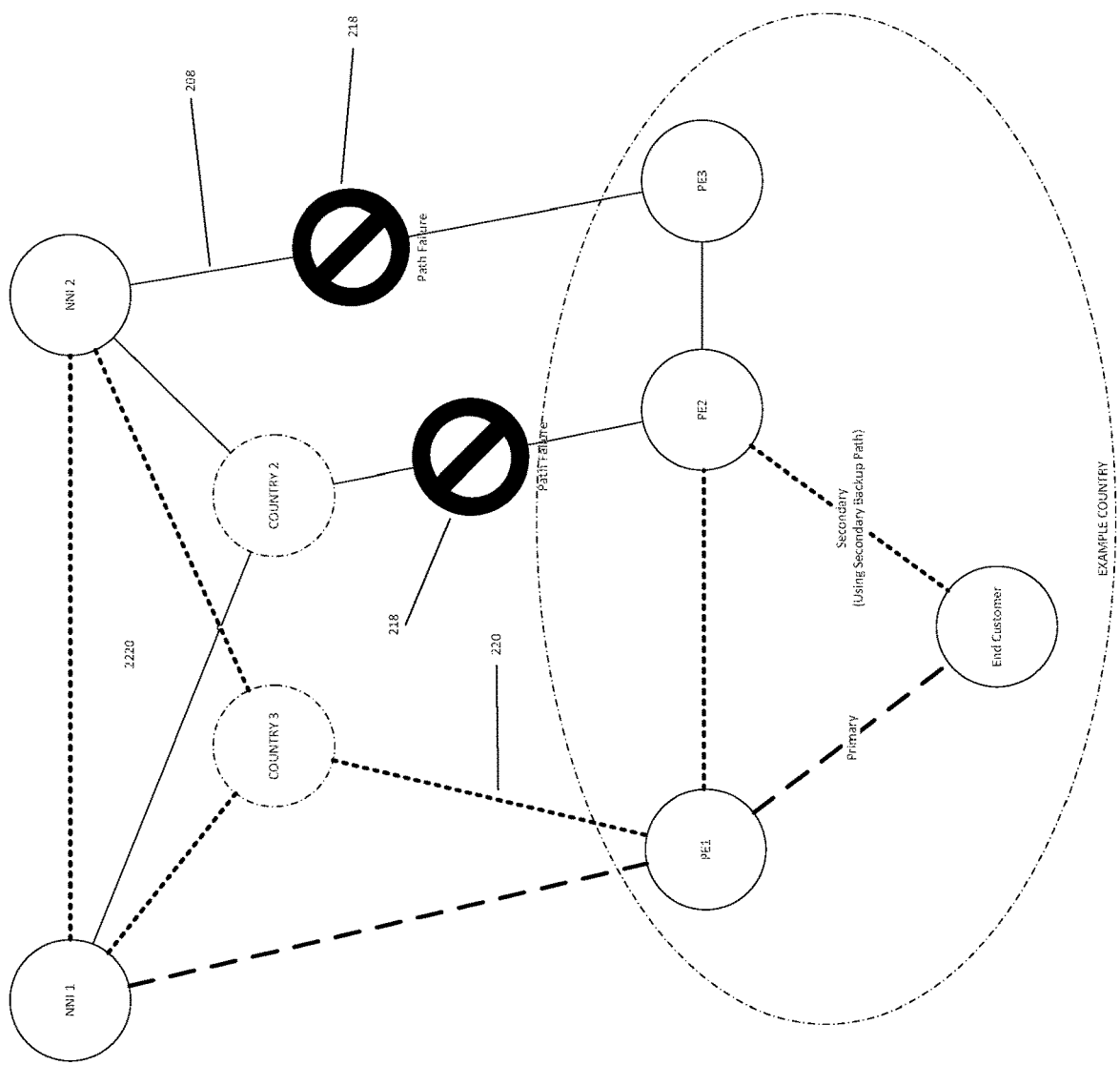

As shown in FIG. 2A, a service type 1 may provide a primary route 202 to a customer network entity 204 via its NNI 1 with first class classification through a defined circuit A and corresponding cable system A to example country 206 via its provider edge ("PE") 1. And a secondary route 208 may be provided to the customer network entity via its NNI 2, also with first class classification, through a circuit/cable system B to example country 202 via its PE 3 and PE 2. FIG. 2B illustrates a path failure 210 at cable system A for the primary route 202, which is, thus, rerouted to a backup route 212 through a defined circuit C and corresponding cable system C through country 2 to example country 202 via its PE 2 and PE 1. As described above and as shown in FIG. 2B, the backup route 212 may be classified at Business Class High. FIG. 2C illustrates a path failure 214 at the secondary route 208, which is, thus, rerouted to the circuit C backup route 216. And FIG. 2D illustrates a path failure 218 at both the secondary route 208 and the circuit C backup route 216, resulting in the secondary route being rerouted to the defined circuit D backup route 220 and corresponding cable system D through country 3 to example country and its PE 1 and PE 2.

And in accordance with an exemplary embodiment of the invention, the above-described entities of the network service system may be implemented as follows.

Service Types: As routes are placed in the network, each service type may have a handful of Label Switched Paths (LSPs) that will provide the paths for them to follow between nodes in the network. As for service instance identification, an extended community may be assigned to each service type. Service instance routes may be marked with the corresponding community as belonging to a service type upon arrival at the remote node. There may be a policy to place the corresponding next hops for remote destinations according to the service type community they are marked with.

Points of Presence: A standard naming schema may be applied to set up the host names of the routers to ensure them to be unique. The router ID (or loopback address) may be used whenever possible as it has to be unique in the domain by definition.

Exit Points: The IP network address may be used as it has to be unique in the domain by definition and can identify the shared media over which it was setup and also the interfaces attached to it.

Exit Point Roles: Extended Administrative Groups may be used. These will act as tags applied on the router's interfaces attached to Exit Points (links).

Point of Presence Affinity Groups: These may be derived from the Point of Presence naming. For example, the first 3 letters of a name to identify routers in the same geographic region (country code) may be used to define an Affinity Group.

Links Identification: This is an extra bit of data that may be helpful at path provisioning time. Taking advantage of Extended Administrative Groups, each link or edge can be distinctly identified with a single ID, instead of using IP addresses. Therefore, a unique Extended Administrative Group may be assigned to each link and the interfaces that are attached to it may be "tagged" with it. The system then later refers to the Extended Administrative Group name for path installation, specifying which Extended Administrative Groups a path can traverse. And routers will run Constrained Shortest Path First (CSPF) and place the right next-hops in their data or forwarding plane tables for each path.

Underlying Infrastructure Identification: A very useful piece of information at path computation time is the ability to identify the underlying infrastructure to which a given link belongs (e.g. which submarine cable system it is traversing). Extended Administrative Groups may be used to tag the links as belonging to said underlying infrastructure.

The naming scheme above may be implemented by use a standardized naming convention, by a database, or other methods known in the art for storing information.

For providing the above-described services, a modeling and path computation element is implemented for defining the configuration to accessing a communication network by a customer network entity.

Figure 3A:
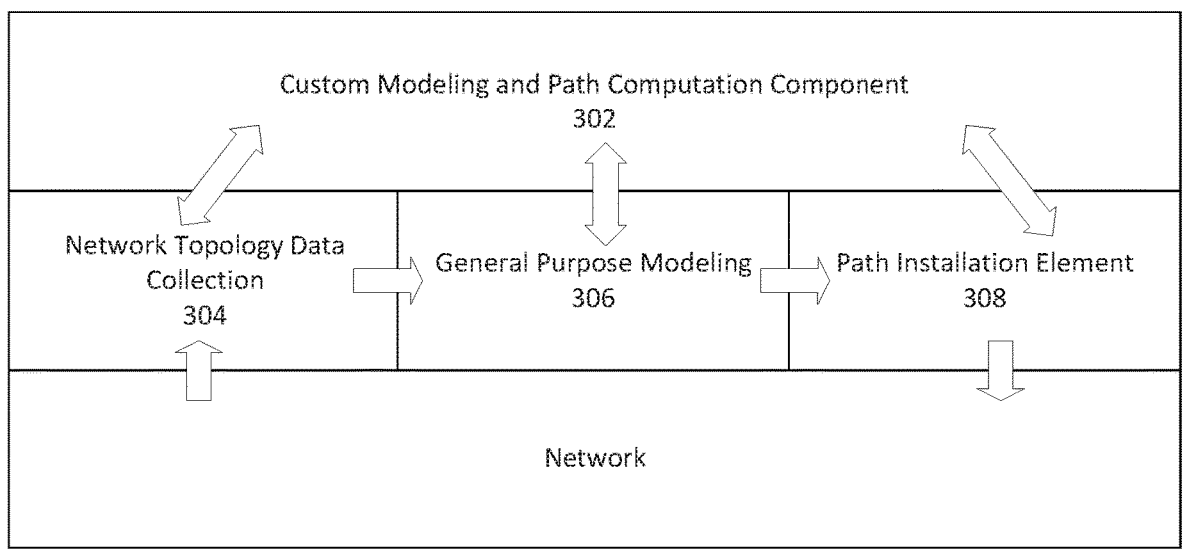
FIGS. 3A-3C are block diagrams illustrating elements for configuring access to a communication network in accordance with an embodiment of the invention.

FIG. 3A is a block diagram illustrating elements for configuring access to a communication network in accordance with an embodiment of the invention. The three-level system allows for centralized intelligence, business rule orchestration, and implementation of customized network constraints. These elements may be implemented using one or more computing apparatuses with instructions for embodying each of the elements to configure the network access.

As shown in FIG. 3A, the custom modeling and path computation component 302 retrieves network topology information 304, including extensions to the model and gives them meaning, then, by using path computation algorithms including Djikstra's shortest path algorithm and Hoffman-Pavley's k-shortest path algorithm, calculates the network paths and assigns them the corresponding role. The user then preferably has the option to review and, if desired, customize these calculated network paths based on other business or network constraints. The calculated paths can also be sent to a modeling component 306 and/or a path installation element 308.

Figure 3B:
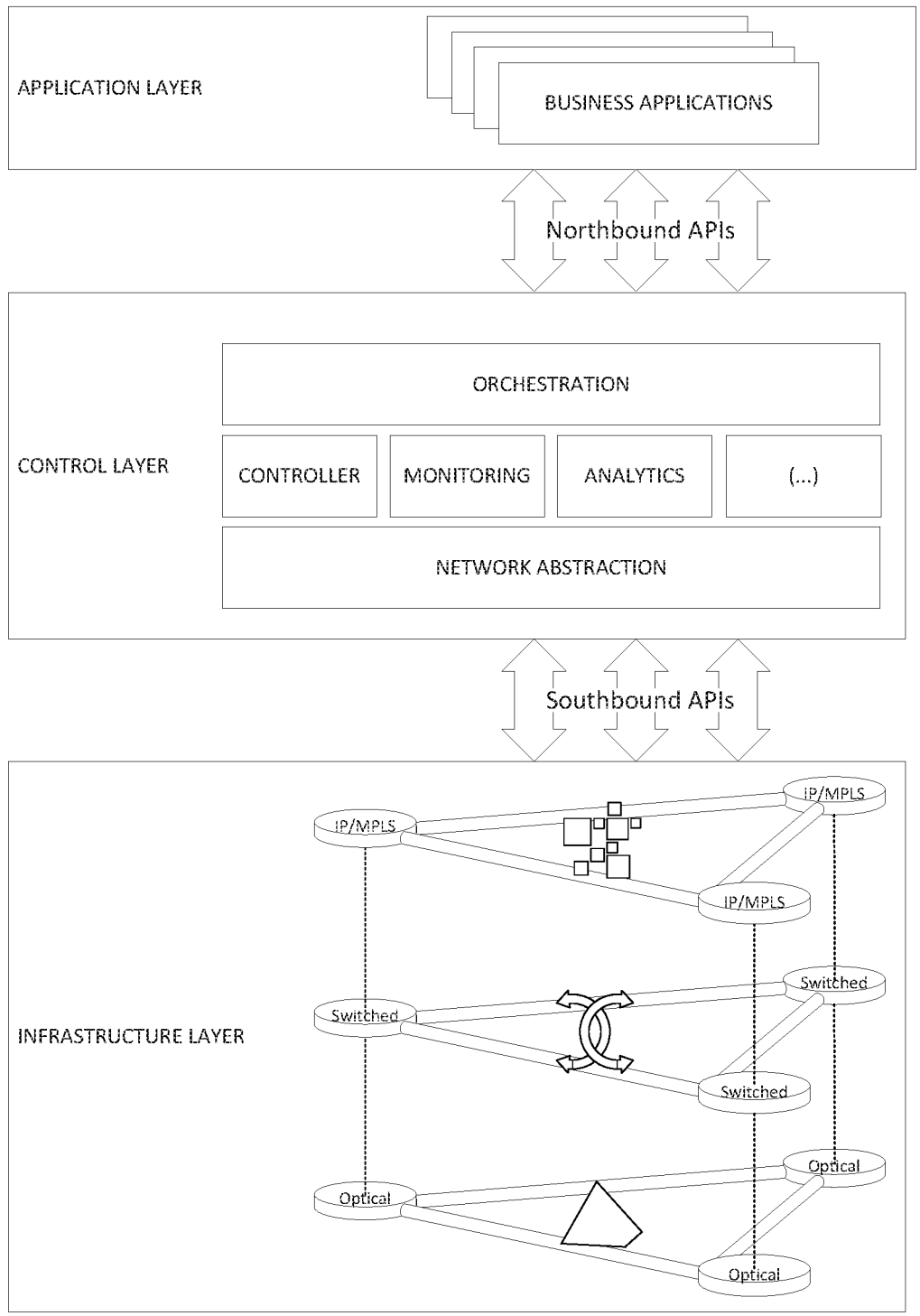
Figure 3C:
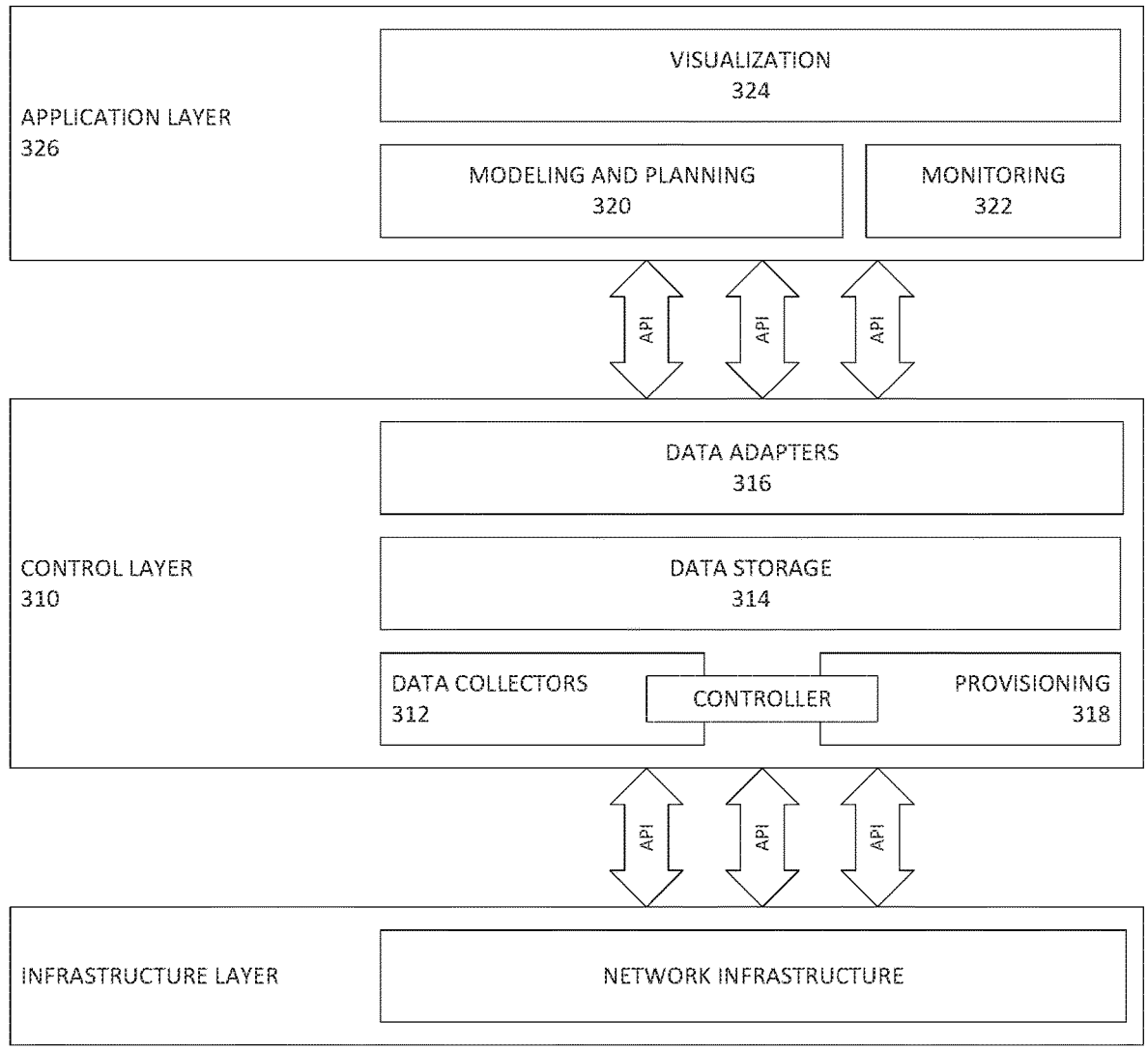

FIGS. 3B and 3C are diagrams showing the network modeling and provisioning system in a Software Defined Networking (SDN) context according to an embodiment of the invention. As shown in FIGS. 3B and 3C, a "network abstraction" layer is built to represent a "transport layer" to the underlying infrastructure, comprised of links and routers that support the Traffic Engineering features, in order to model the network paths. And an "actuator," embodied by provisioning and controller elements (as shown in FIG. 3C), is included to install those paths back in the network. Thus, the control layer 310 is divided into its different components: Network Data Collectors 312, Network Data Storage 314, Network Data Adapters 316, and Provisioning Components 318 in cooperation with Modeling and Planning Components 320, Monitoring Components 322, and Visualization Components 324 that may reside on the application layer 326.

Network Data Collectors:

The basic information needed to bring up the abstraction component is the nodes and links that make up the network. More information can be stacked to provide better insight and allow for more complex solutions to be developed. Table 2 shows some examples.

TABLE 2

Network Data Collectors 312

| Data | Purpose | Example Protocols or Features Involved | Example Collection Methods |
|---|---|---|---|
| Network Topology | Network Abstraction | LLDP, IGP, BGP, BGP-LS, PCEP, etc. | BGP, BGP-LS, PCEP, NETCONF, SNMP, CLI, etc. |
| Traffic Engineering Database (TED) | Network Abstraction | IGP, BGP, BGP-LS, PCEP, etc. | IGP, BGP, BGP-LS, PCEP, NETCONF, SNMP, CLI, etc. |
| Transport Tunnels (LSPs) Configuration | Network Abstraction | RSVP-TE, PCEP, etc. | PCEP, NETCONF, SNMP, CLI, etc. |
| Transport Tunnels (LSPs) Status | Network Abstraction | RSVP-TE, PCEP, etc. | PCEP, NETCONF, SNMP, CLI, etc. |
| Service Configuration | Network Abstraction | NETCONF, CLI, etc. | NETCONF, SNMP, CLI, etc. |
| Service Status | Network Abstraction | NETCONF, CLI, etc. | NETCONF, SNMP, CLI, etc. |
| Logs | Event Triggering, Event Correlation, etc. | SYSLOG | SYSLOG |
| Traffic Flow Data | Statistics, Flow Identification, Flow Localization | IPFIX/FLOW | IPFIX/FLOW |
| Bandwidth Usage | Statistics | Auto-Bandwidth, SNMP | IGP, BGP-LS, PCEP, NETCONF, SNMP, CLI, etc. |

There are cases where the information retrieved from the network is redundant, like network topology and Traffic Engineering Database (TED) where the TED may supersede the former.

Network Data Storage 314:

Raw network data may be stored at one or more extendible local and/or remote storage systems that are able to process old data the same way as new data, allowing for rewind capabilities, i.e. show an earlier state of the network.

Network Data Adapters 316:

This component takes care of translating raw network data into something that can be understood by the rest of the pieces of the system, it is the Abstraction Layer itself. It is the key element to expose the network data in a standard form relevant to the system not only in an heterogeneous environment with devices from multiple vendors but also in mono-vendor configurations. The modeling, planning and monitoring components will feed from its output to give meaning to the network abstraction layer and present it to path computation algorithms and ultimately to the human users of the system through the visualization components.

Modeling and Planning Components 320:

The network model is embedded within the code of the component, the business rules and logic are imprinted in its structure and enable us to actually build the core of our solution, based on the business and network models discussed before. It receives input from the Abstraction Layer and the user, and outputs route or path computation results through a specialized Graphical User Interface (GUI) designed to manage the planning and modeling process. It is also in charge of interfacing with the Provisioning Components to install, modify or remove paths from the network. It also allows to run "what if" scenarios and simulate network changes and outages by manipulating the provided network information.

Provisioning Components 318:

The provisioning components 318 may be "smart actuators", or "SDN Controllers", and their mission resides in awaiting and executing instructions sent from the Modeling and Planning Components 320 in order to install, modify or remove paths from the network. Separate Provisioning Components 318 may also be used to deploy services on the network. These elements should have duplex communication channels with the network, modeling and planning and monitoring components to receive and send notifications about planned changes and task execution on the network and its results.

Monitoring Components 322:

These elements take the role of traditional monitoring systems but with enhanced network awareness. Their objective is to present the user with a view of the network, routes or paths, and services. It may have rewind capabilities (i.e. show an earlier state of the network), have reporting capabilities, be service (and service path) aware and be also capable of modeling the planned behavior of routes based on network configuration and compare it with the current or any given network status snapshot.

Visualization Components 324:

These components encompass the different Graphical User Interfaces (GUIs) that present data from different elements of the system. In general, GUIs will be targeted to the end user and will have different characteristics in terms of accessibility, technology used and user/group management. A sample set up will include the basic GUIs from Table 3.

FIG. 3. The process may be performed by one or more computing apparatuses executing instructions corresponding to the steps of the process illustrated in these figures.

Figure 4A:
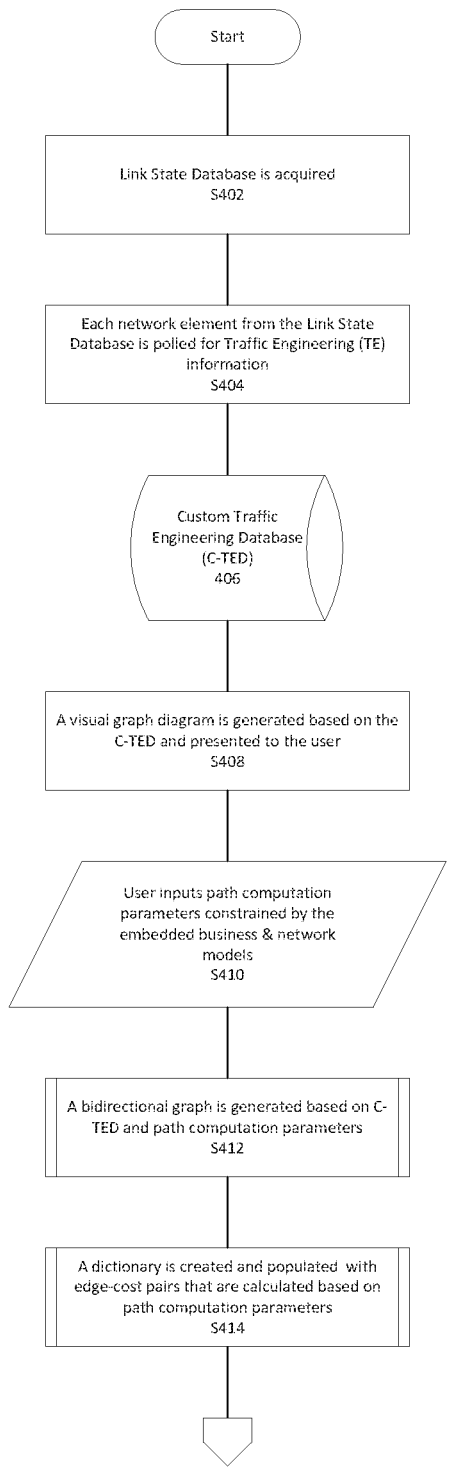
FIGS. 4A, 4B, and 4C are flow diagrams illustrating a network modeling, configuration and deployment process in accordance with an embodiment of the invention.

As shown in FIG. 4A, as an example of the custom modeling and path computation component retrieving network topology information, a link state database is acquired (S402) and each network element from the link state database is polled for traffic engineering (TE) information (S404). A Customized Traffic Engineering Database (C-TED) (406) may be compiled by means of combining a route discovery system and direct network element polling. FIG. 5 illustrates a graphical representation of a C-TED in accordance with an embodiment of the invention. Such an implementation can be capable of both interfacing with third party link state discovery systems using XML-RPC (Extensible Markup Language-Remote Procedure Calling Protocol) APIs (Application Programming Interfaces) or polling the link state information generated by the network devices and compiled into a database published by BGP-LS (Border Gateway Protocol-Link State) to a centralized entity that is capable of making the link state information available to be consumed by a NETCONF (network configuration protocol) client—for example, and presenting a visual graph (S408) as illustrated in FIG. 4A. The C-TED may be completed by polling the network devices for information that is not available as part of the link state database, i.e. extended administrative groups names, IP interfaces inventory, probe results for RTT calculations, auto-bandwidth statistics, etc. (hence the customized nature of the TED).

According to an exemplary embodiment of the invention, the network modeling may be initiated with edge cost computations and selecting relevant variables (S410). Examples of common used variables would be total or available bandwidth, delay or round trip time, monetary cost per bandwidth capacity unit, link reliability, etc. Such variables preferably include both business and network considerations. One approach in a greenfield deployment where no statistical or historical data is available may be to select total bandwidth as a starting point and modify the cost computation method later when more information on network and traffic behavior can be retrieved.

TABLE 3

Visualization Components 324

| Source Components | GUI | Data Format | Target Platform | Target User Group |
|---|---|---|---|---|
| Modeling & Planning, Provisioning | Modeling & Planning GUI | Diagrams, tables, charts | Usually Desktop | Engineering, Planning Teams |
| Monitoring (Network and Services: Real Time and Rewind, Config vs Current Status, Reporting) | Monitoring GUI | Diagrams, tables, charts, maps, dashboards | Usually Web | NOC, Operations Teams |
| Monitoring (Network: Selected snapshots) | Commercial Insight GUI (Available routes for sale) | Diagrams, tables, charts, maps, dashboards | Usually Web | Sales, Service Management Teams |
| Monitoring (Services subset: Real Time, Config vs Current Status, Reporting) | Customer Portal GUI | Diagrams, tables, charts, maps, dashboards | Usually Web | Partners, End-Customers |
| General System Management (All System Components, Configuration) | System Management GUI | Diagrams tables, charts, maps, dashboards | Usually Web | System Administrators |

Figure 4B:
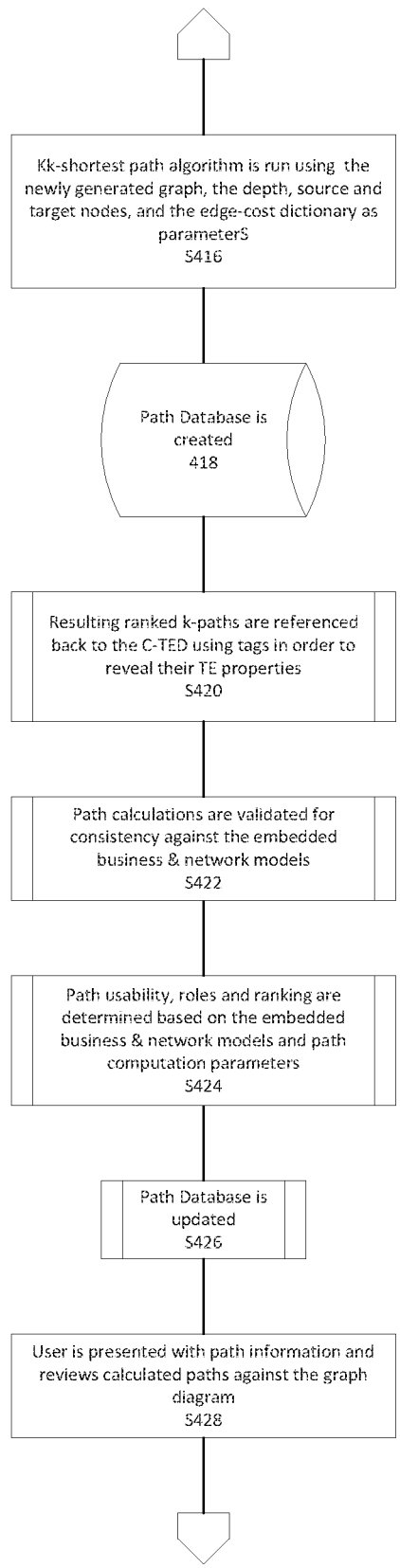
Figure 4C:
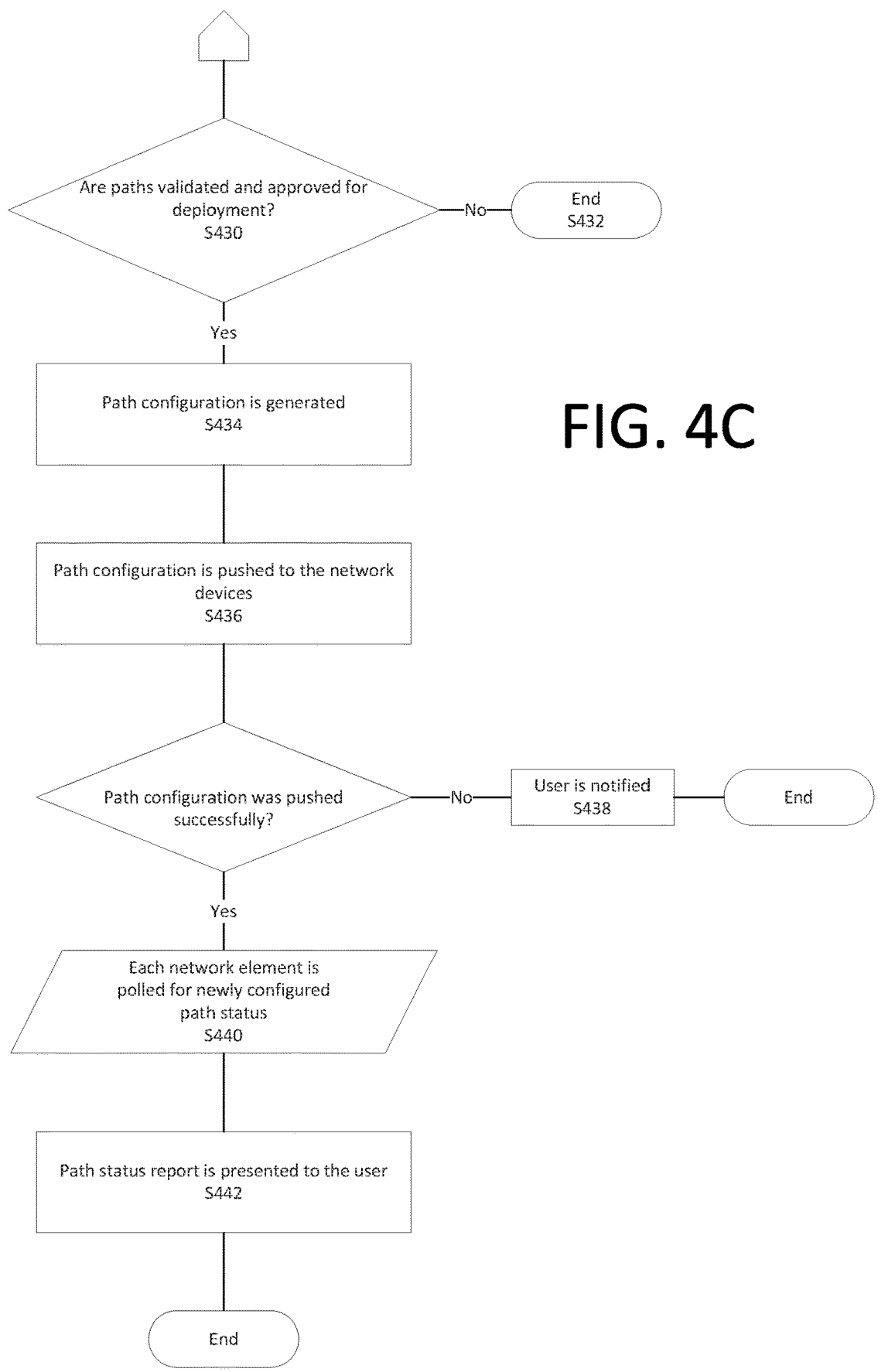

FIGS. 4A-4C are flow diagrams of a process for implementing the network configuration elements illustrated in The performance statistics that are used as input to the modeling process are collected from the network either by directly polling the network elements for pre-configured probe results and/or through a third party element that collects the delay, jitter, packet loss and any other available key performance indicators (KPIs), making the information available through an API. The information is then mapped to the corresponding link element in the C-TED. This may include local loop links to the customer premises, over any local loop provider.

The traffic statistics may not only be collected as part of the link state information using auto-bandwidth statistics but also through a third party element that polls traffic information using Simple Network Management Protocol (SNMP) and/or receives traffic flow data by using NetFlow/IPFIX (IP Flow Information Export) or similar means, this data is then mapped to the corresponding links and nodes in the C-TED. If the traffic statistics belong to a given service instance configured inside a node, they are also mapped to the corresponding path within the network by collecting the service instance next hops for each destination to which the actual service traffic is bound. This allows for more granularity at modeling time and also to present detailed information for the service context, which can be represented in the visual diagram along with service entry points and paths on the network.

Figure 16:
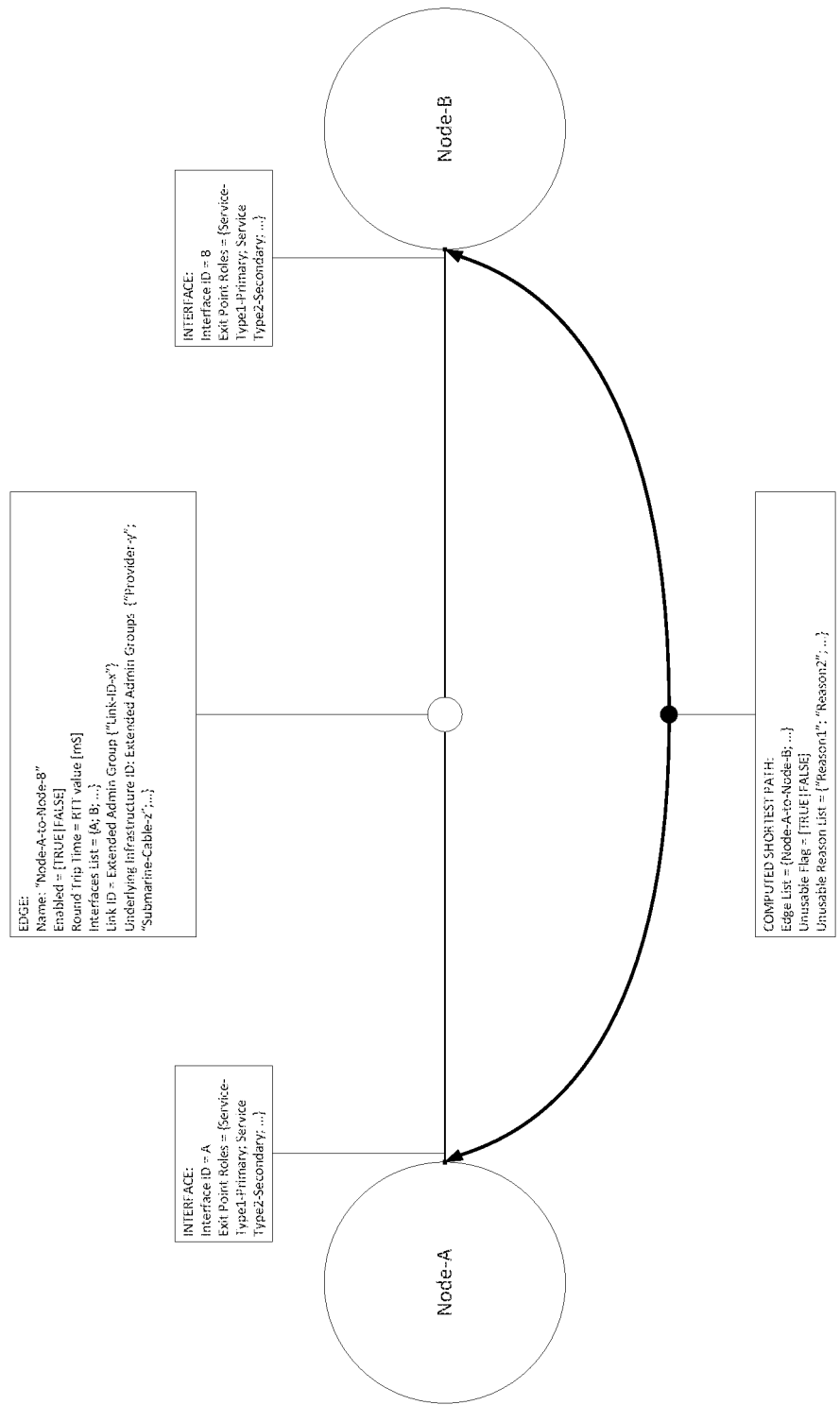
FIG. 16 illustrates how properties may be added to elements to give flexibility to the path computation process and allow for richer interaction with the network.

According to an exemplary embodiment of the invention, properties may be added to elements to give flexibility to the path computation process and allow for richer interaction with the network graph as depicted in FIG. 16.

Edges:
Enabled/Disabled Switch: This will provide the ability to dynamically exclude links from the graph at path computation time.
Round Trip Time (RTT): Round Trip Time between its endpoints.

The actual path computation is performed by running Hoffman & Pavley's ranked k-shortest path algorithm, or the like, on a C-TED-derived bidirectional graph with tagged edges (S412). Hoffman & Pavley's algorithm will basically run Dijkstra's shortest path algorithm and then backtrack the shortest path tree to find the rest of the possible paths by scanning all nodes on a found shortest path. The output is a list of non-looped possible paths ranked by cost, and the edge tag is used as an index to reference back to the C-TED elements and reveal the path Traffic Engineering (TE) properties.

The cost of each link or edge can be manipulated at will, currently either unreserved bandwidth or total bandwidth and/or delay can be used as parameters for edge cost calculation, the cost value can be computed using a custom algorithm and assigned to each edge dynamically. The edge cost algorithm is flexible and extensible depending on the particular network environment. The cost information is compiled into a dictionary populated with edge-cost pairs (S414). The edge-cost pair dictionary preferably contains both business and network costs.

The depth (maximum number of paths to retrieve) can also be manipulated. The graph fed to the algorithm, edge cost calculation strategy, and depth are defined and tailored based on the aforementioned service constraints.

As part of the path calculation process and depending on the scenario (service type, source/target nodes involved, affinity groups, links, etc.), a decision may be made whether or not to calculate a ranked set of diverse paths. To calculate diverse paths, the algorithm is run with a given depth always higher than the desired number of output paths. Then, each path is recursively compared by rank to determine diversity based on common vertices and edges traversed to calculate link, node and combined node-link diversity indexes. The output in this case is a list of best paths ranked by diversity index. Cost and diversity index can even be combined in the same computation cycle.

The process proceeds to obtaining the output of Hoffman & Pavley's k-shortest path algorithm as the base step towards embedding the network model in the path computation process, as shown in FIG. 4B (S416). This process provides complete path discovery over the network. Once this complete path is developed, in addition to the k-shortest past algorithm, a series of subroutines that obtain a valid set of paths within the business and network model are run, either as augmentations to the k-shortest path algorithm or after the algorithm is complete. These subroutines prune and reorder the k-shortest path output to further optimize the path. Exemplary embodiments of such subroutines are described in further detail below.

Once the list of possible paths is generated and the path database (418) is created and populated, the C-TED is referenced to get the elements that represent the nodes and links that comprise each path plus their Traffic Engineering properties and validate the path calculations for consistency against the embedded network model (S420-S424). Then the path roles and ranking are selected based on the same network model and path computation parameters and fed back to the path database (S426).

At this point, the user is presented with the computed path database and is able to visually inspect, review and validate the paths for deployment (S428).

As shown in FIG. 4C, once the paths are calculated and validated, a user is able to review the output (S430). The user may modify specific paths, prune paths, and tailor the paths to the business and network needs (S432). After this calculation and tailoring, the actual configuration to be pushed back to the network elements for installation is automatically generated (S434) based on service type and element properties (e.g. exit point role, affinity group, etc.) and finally deployed to the network elements by means of NETCONF—thus, implementing the path installation element illustrated in FIG. 3 (S436). The system allows for deployment to all network devices on the network, rather than requiring a manual deployment on individual network devices. Existing routing devices can be used, with the system translating the output of the above-described process to install in accordance with the format used by the individual devices.

The last steps of the process are to notify the user whether or not the paths have been successfully pushed to the network (S438), then poll the network devices for newly configured path status (S440) and present the user with a path status report (S442).

Figure 15:
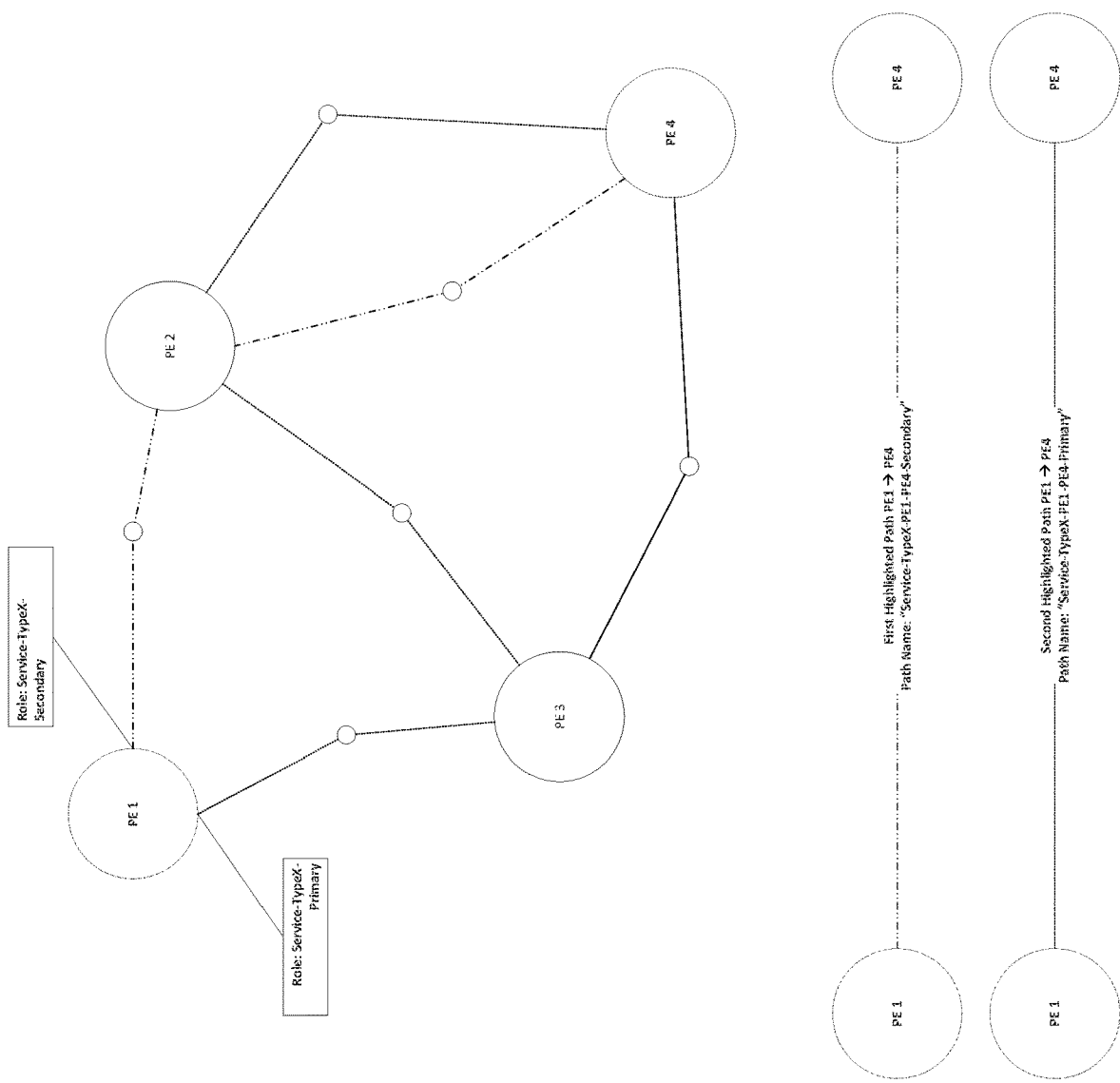
FIG. 15 illustrates a scenario in implementing an Exit Point Role Ordering Routine according to an exemplary embodiment of the invention.

According to an exemplary embodiment of the invention, the network configuration elements may be implemented through a set of routines as follows:

<START>
1—CHECK If Source & Target Nodes are not the same, if they are the same then exit.
2—GET Path Type Identification
  a. Input: Service Type for which paths are computed
  b. Output: Path Type ID
3—GET Source & Target Affinity Group Identification
  a. Input: Source & Target Hostnames
  b. Output: Source & Target Affinity Groups ID
4—GET Source Vs. Target Affinity Groups minimum Round Trip Time (best Round Trip Time)

a. Input: Source & Target Affinity Groups ID; Round Trip Time Matrix (between each and every node of the network)
b. Output: Minimum Round Trip Time between Source & Target Affinity Groups 5—BUILD the Network Graph
a. Input: Nodes, Enabled Edges, Enabled Edges Cost (Edge Cost=Edge Band with)
b. Output: Network Graph 6—RUN KSP Algorithm
a. Input: Network Graph, Source & Target Nodes, Maximum Amount of Paths to Compute, Operation Timeout Threshold
b. Subroutines:
   i. Run Exit Point Roles (Naming) Routine (see FIGS. 6A & 6B)
   ii. Compute Path Round Trip Time (sum of RTT of traversed edges)
   iii. Transit Denied Routine (see FIG. 7)
c. Output: Ranked Shortest Path List 7—RUN Affinity Group Loops Metric Routine (see FIG. 8)
8—RUN Affinity Group Hop Count Metric Routine (see FIG. 9)
9—RUN Affinity Group RTT Metric Routine (see FIG. 10)
10—RUN Bottleneck Metric Routine (see FIG. 11)
11—RUN Diversity Ordering Routine (see FIG. 12)
12—RUN Target Affinity Group Metric Ordering Routine (see FIG. 13)
13—RUN Discard Unusable Pruning Routine (see FIG. 14)
14—RUN Exit Point Role Ordering Routine (see FIG. 15)
15—PRUNE Ranked Path List to Desired Length
a. Input: Ranked Shortest Path List.
b. Output: Ranked Shortest Path List pruned to maximum number of paths requested.
<END>

Each routine may be executed independently from the others in the order stated above. Routines may be classified as "optional", "optional on a Service Type basis", "mandatory", "variable", "minimum default" and "override", the meaning of each term can be explained as in Table 2.

TABLE 2

Routine Types

| Term | Meaning |
| --- | --- |
| Optional | Running the routine is optional, a configuration knob is made available to tell the algorithm whether to execute the routine instructions or skip it. |
| Optional on a Service Type basis | Running the routine is mandatory for some Service Types as it may be required by its definition. Other Service Types will give the flexibility of running or skipping the routine. |
| Mandatory | Running the routine is mandatory in all cases as it is key to the path computation process. |
| Variable | The routine requires an extra input parameter to run. The parameter is variable within a range. |
| Minimum Default | The routine uses a minimum default value for the variable input parameters it requires to run. |
| Override | The routine overrides other previously ran routines to some extent. |

Figure 6A:
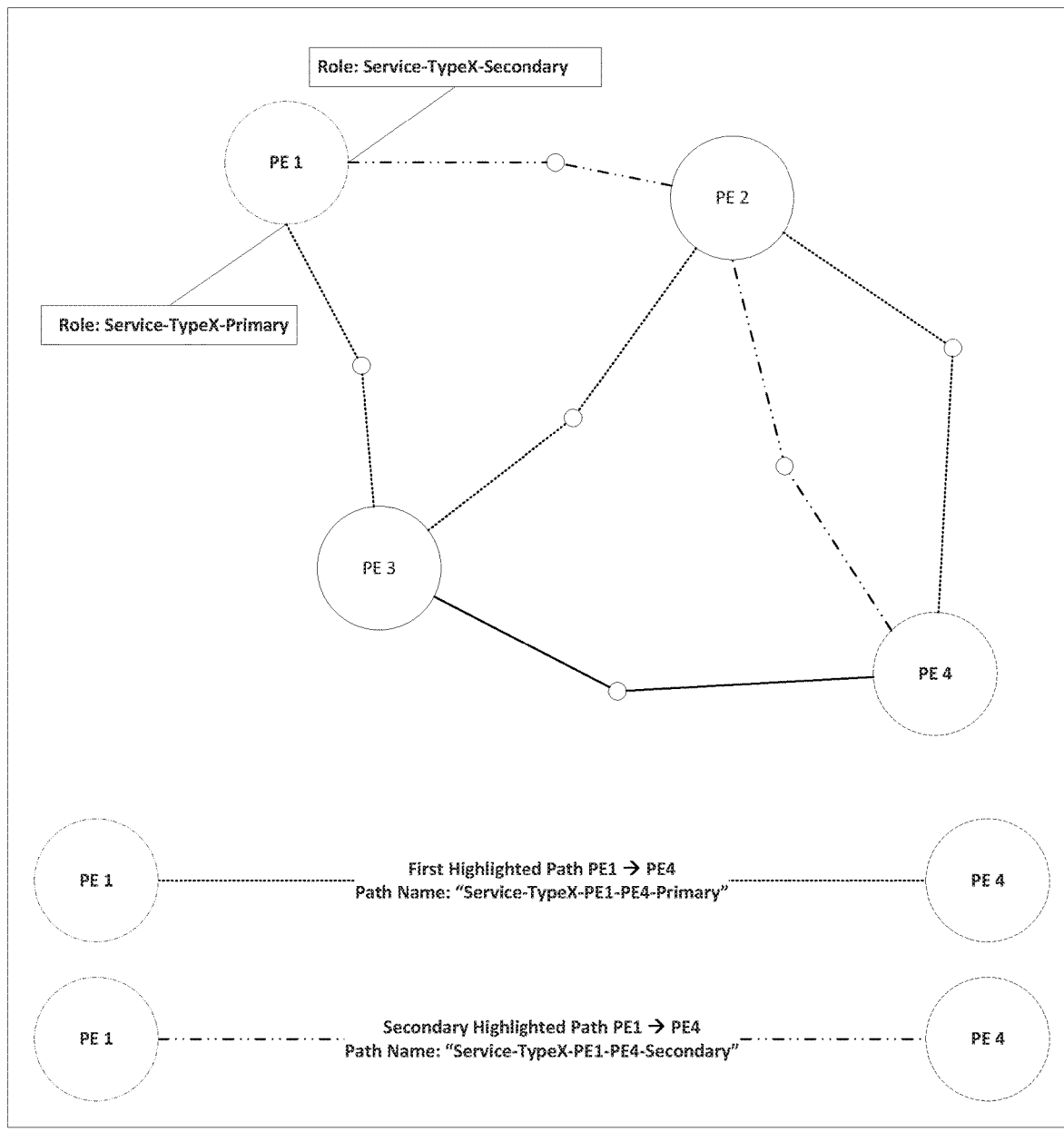
FIGS. 6A and 6B illustrate scenarios in implementing an Exit Point Roles Routine according to an exemplary embodiment of the invention.
Figure 6B:
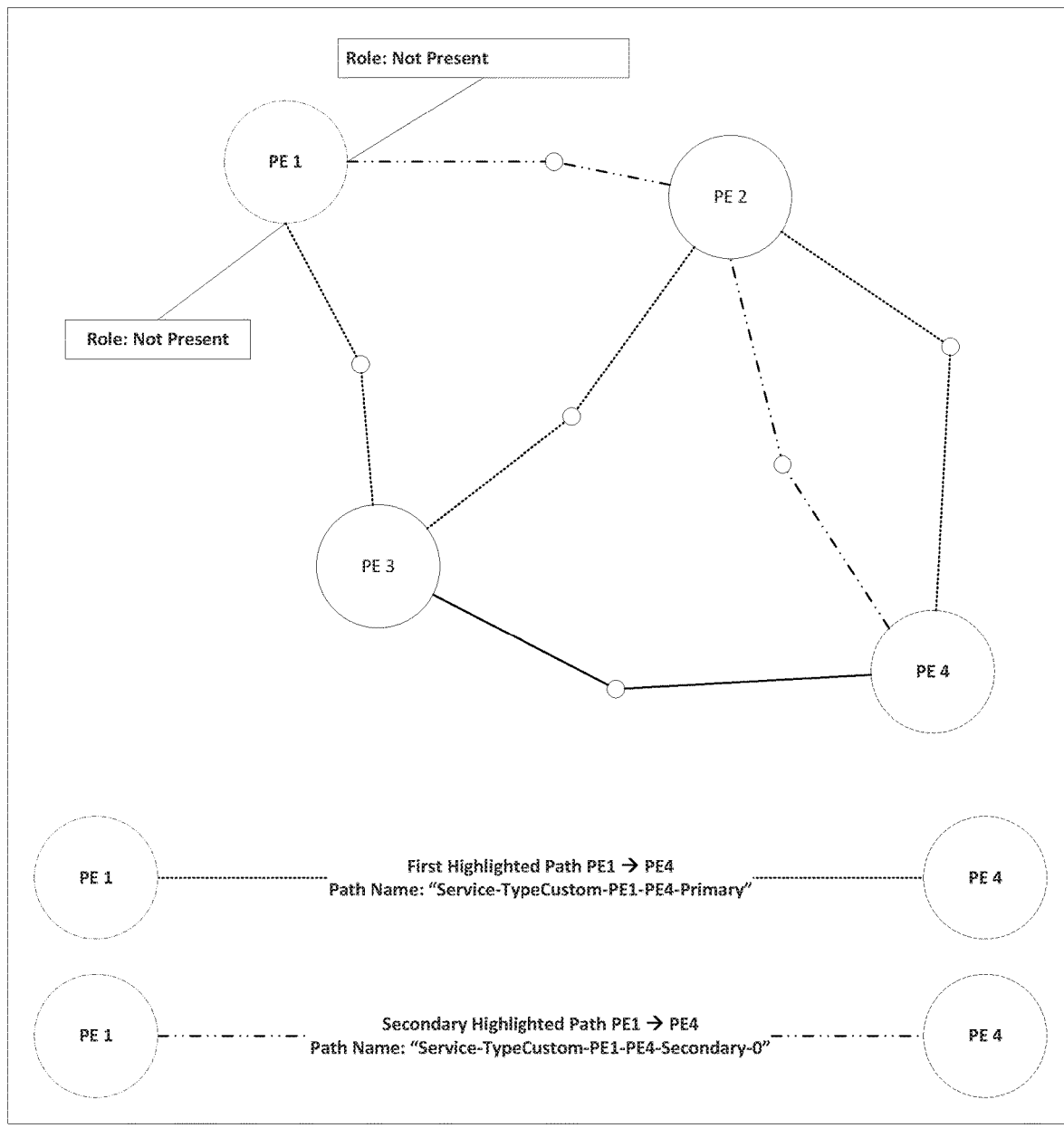

Exit Point Roles Routine (Optional on a Service Type Basis), Naming (Mandatory):

FIGS. 6A and 6B illustrate scenarios in implementing an Exit Point Roles Routine according to an exemplary embodiment of the invention. Recalling that the network model defines the Exit Point Roles as tags applied on a router's interfaces attached to Exit Points (links or edges), these roles would ultimately define the order in which computed paths would be named and presented for a given service type. Therefore, a first step would be to identify whether an Exit Point Role, and which one, has been assigned to the interfaces attached to edges (Provider Edges, "PE") that the paths traverse and then name, reorder and/or prune these accordingly.

As shown in FIG. 6B, Exit Point Roles may be optional, or not to be used for some Service Type or another custom solution. In such a case, it is important to note that the first path must be marked as "primary" and successively paths as "secondary" and appended with an ordinal or some symbol to tell these apart (this last part may be true even when Exit Point Roles are to be used, it may depend on configuration strategy and/or Vendor implementation).

If Exit Point Roles are not optional (and not present) then the path will be marked as "Unusable" and the reason will be added to its Unusable Reasons list.

Transit Denied Routine (optional on a Service Type basis)

Figure 7:
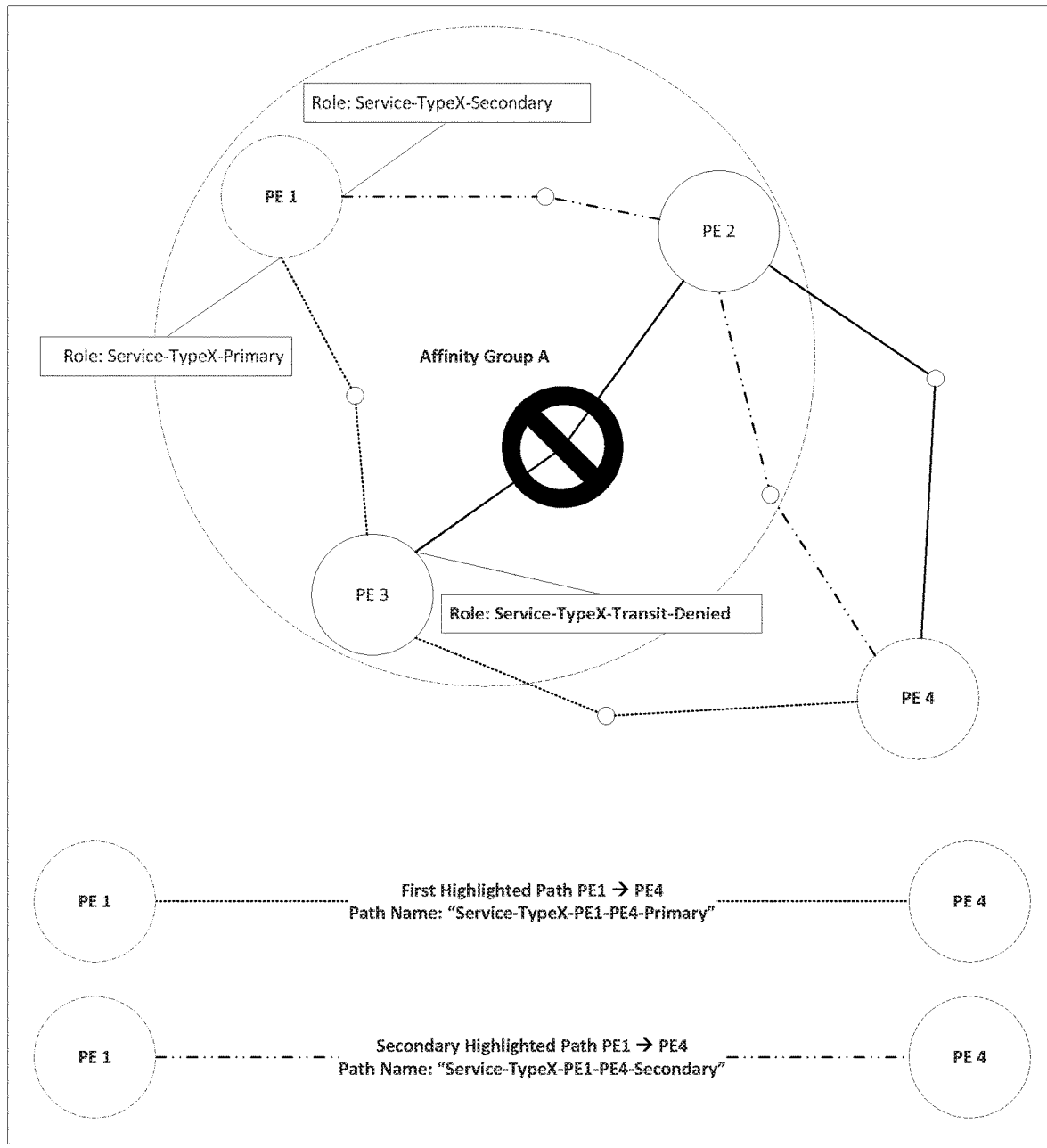
FIG. 7 is a diagram illustrating a scenario in implementing a Transit Denied Routine according to an exemplary embodiment of the invention.

As illustrated in FIG. 7, Exit Point Roles also allow for marking an Exit Point as "Transit Denied" for a given Service Type (business rule). This is relevant only within the Source Affinity Group and helps enforce Service Type route diversity rules.

Figure 8:
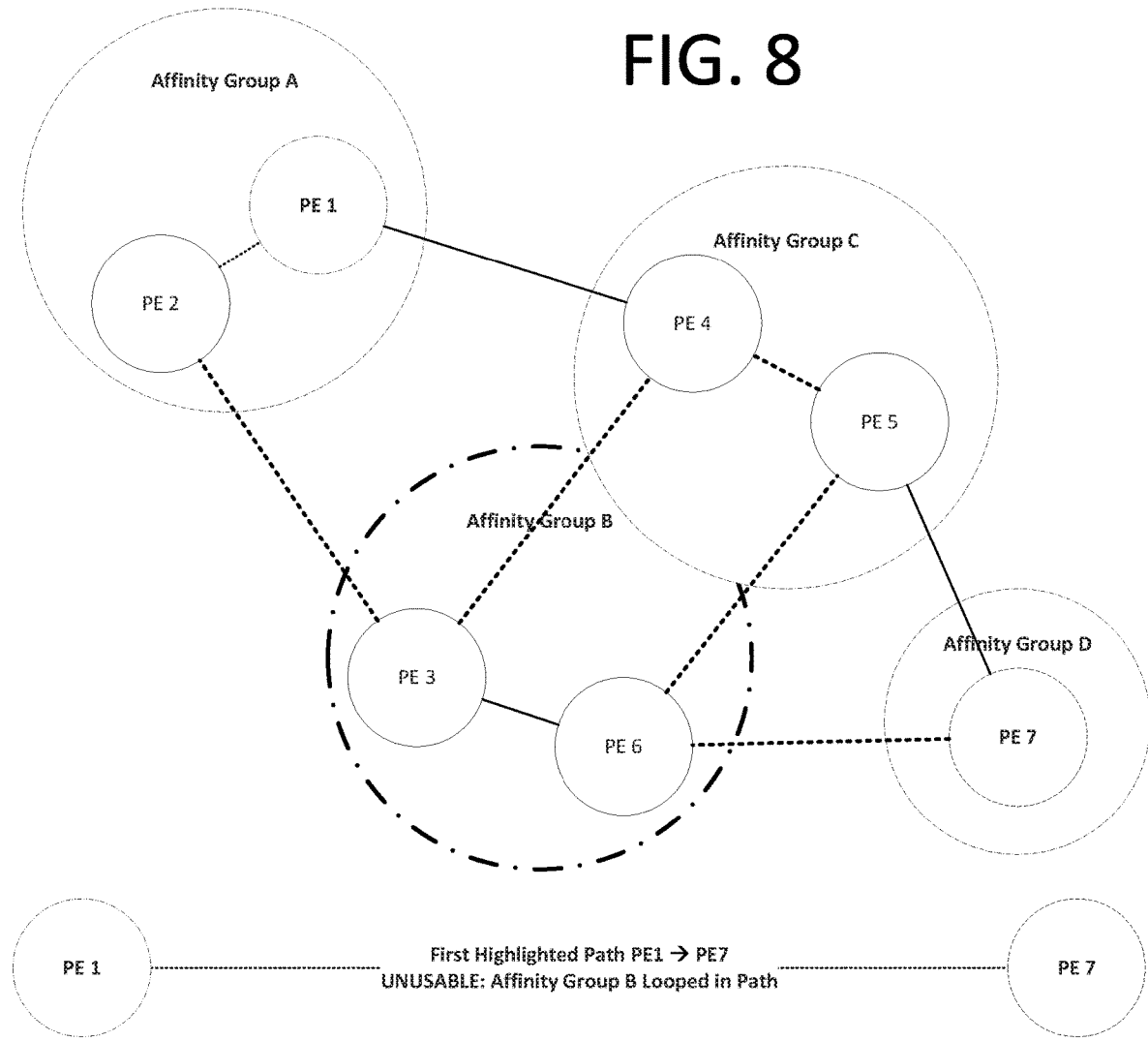
FIG. 8 illustrates a scenario in implementing an Affinity Group Loops Metric Routine according to an exemplary embodiment of the invention.

Affinity Group Loops Metric Routine (Mandatory):

To ensure diversity and to avoid suboptimal routing, all paths that traverse a given Affinity Group twice will be marked as "Unusable" and the reason ("Affinity Group B Looped in Path") added to its Unusable Reasons list, as illustrated in FIG. 8

Figure 9:
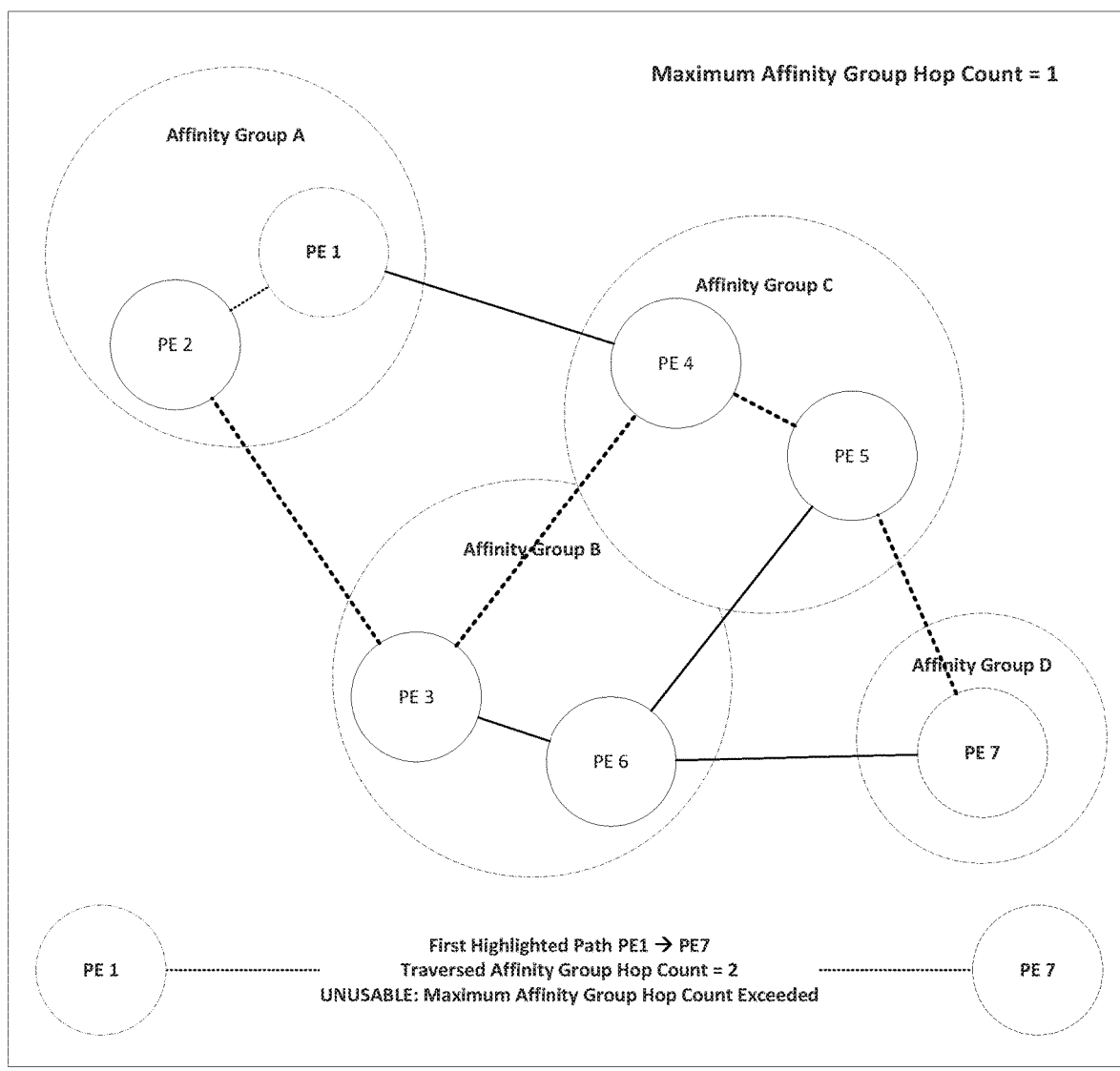
FIG. 9 illustrates a scenario in implementing an Affinity Group Hop Count Metric Routine according to an exemplary embodiment of the invention.

Affinity Group Hop Count Metric Routine (Mandatory, Variable, Minimum Default):

To avoid suboptimal routing, a limit of Affinity Groups traversed is set. If the path exceeds the maximum number of Affinity Group hops it will be marked as "Unusable" and the reason ("Maximum Affinity Group Hop Count Exceeded") added to its Unusable Reasons list, as illustrated in FIG. 9.

Variables:
  Maximum Hop Count (range from 1 to infinity, maximum value may be enforced)
Minimum Default: Depends on network topology, usually an average of 3 for a typical sparse partial mesh network with a median 2.6 to 3 Exit Points over diverse underlying infrastructure.

Figure 10:
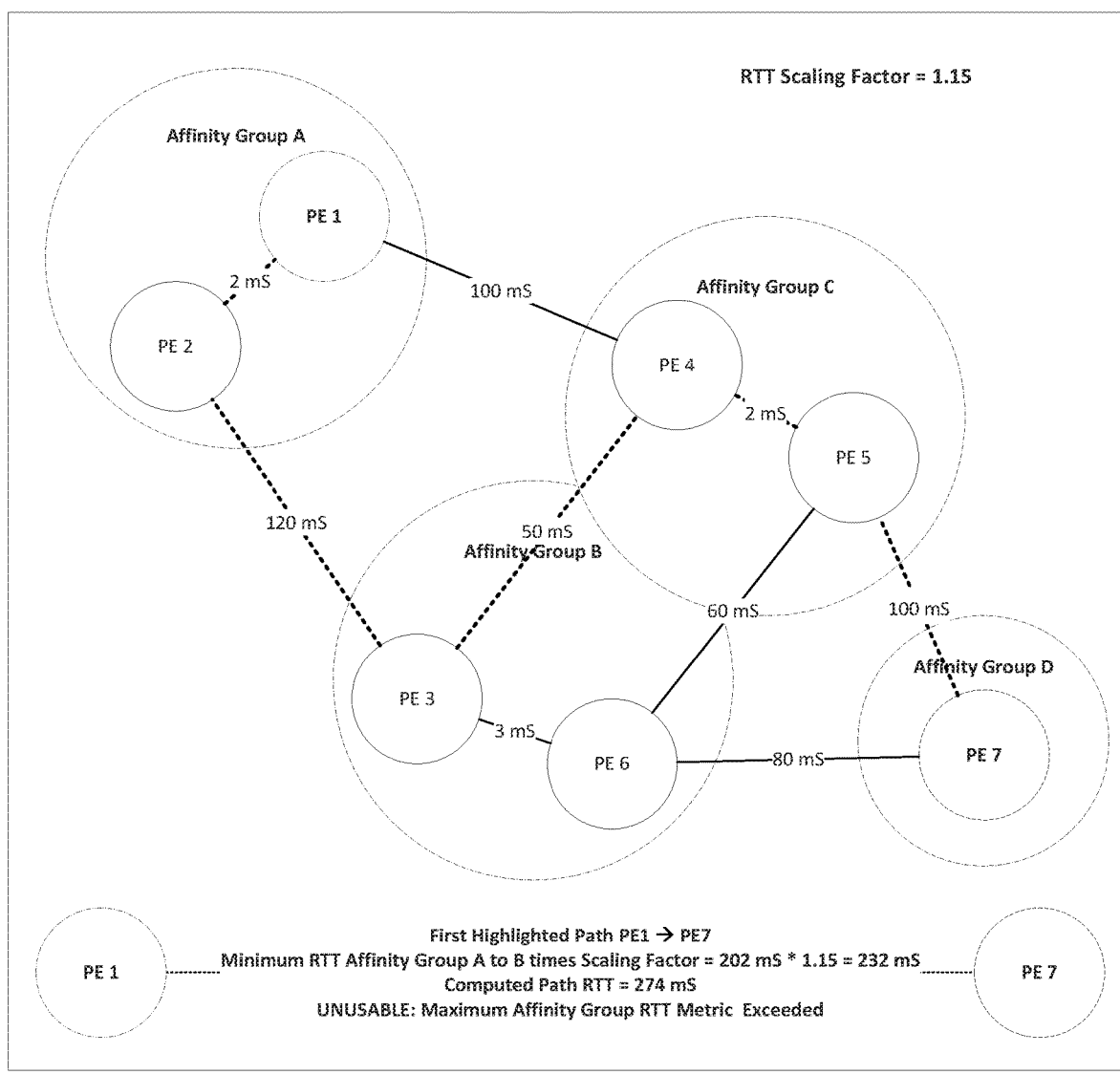
FIG. 10 illustrates a scenario in implementing an Affinity Group RTT Metric Routine according to an exemplary embodiment of the invention.

Affinity Group RTT Metric Routine (Optional, Variable, Minimum Default):

To avoid suboptimal routing, the RTT of a path is compared to the minimum RTT between Source and Target Affinity Groups times an RTT scaling factor. As illustrated in FIG. 10, if the path exceeds the minimum RTT between Source and Target Affinity Groups times the RTT scaling factor it will be marked as "Unusable" and the reason ("Maximum Affinity Group RTT Metric Exceeded") added to its Unusable Reasons list.

Variables:
  RTT Scaling Factor (range from 1 to infinity, maximum value may be enforced)

Minimum Default: Depends on network topology, usually an average of 1.15 for a typical sparse partial mesh network with a median 2.6 to 3 Exit Points over diverse underlying infrastructure.

Figure 11:
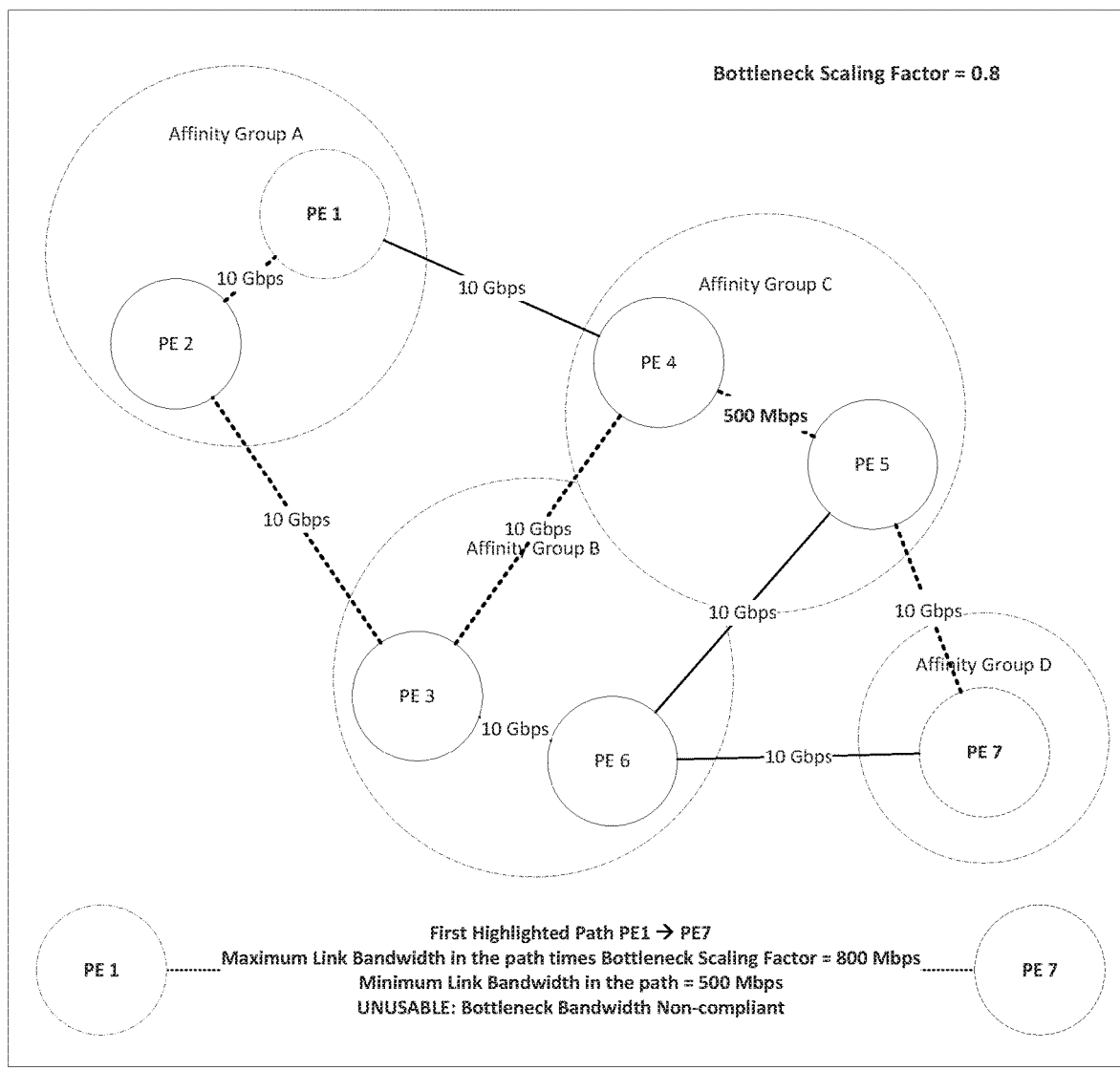
FIG. 11 illustrates a scenario in implementing a Bottleneck Metric Routine according to an exemplary embodiment of the invention.

Bottleneck Metric Routine (Optional, Variable, Minimum Default):

To avoid suboptimal routing, the bandwidth of links a path traverses is compared to the maximum bandwidth among those links times a bottleneck scaling factor. If any other link the path traverses falls behind the maximum bandwidth among those links times a bottleneck scaling factor, it will be marked as "Unusable" and the reason ("Bottleneck Bandwidth Non-compliant") added to its Unusable Reasons list, as illustrated in FIG. 11.

Variables:

Bottleneck Scaling Factor (range from 0 to 1, not including 0, minimum value may be enforced)

Minimum Default: Depends on network topology (links bandwidth), usually an average of 0.6 to 0.8 for a network with a really sparse link capacity, for example networks with link capacity ranging from tens of megabits per second to thousands.

Diversity Ordering Routine (Optional):

To maximize diversity each and every path, a "reference path" is compared to the subsequent ones in the ranked path list and the most distinct path in terms of nodes, edges and/or underlying infrastructure [see FIG. 12] is moved right below the reference path, becoming the next reference path and so on until the ranked path list has been completely traversed and reordered.

Figure 13:
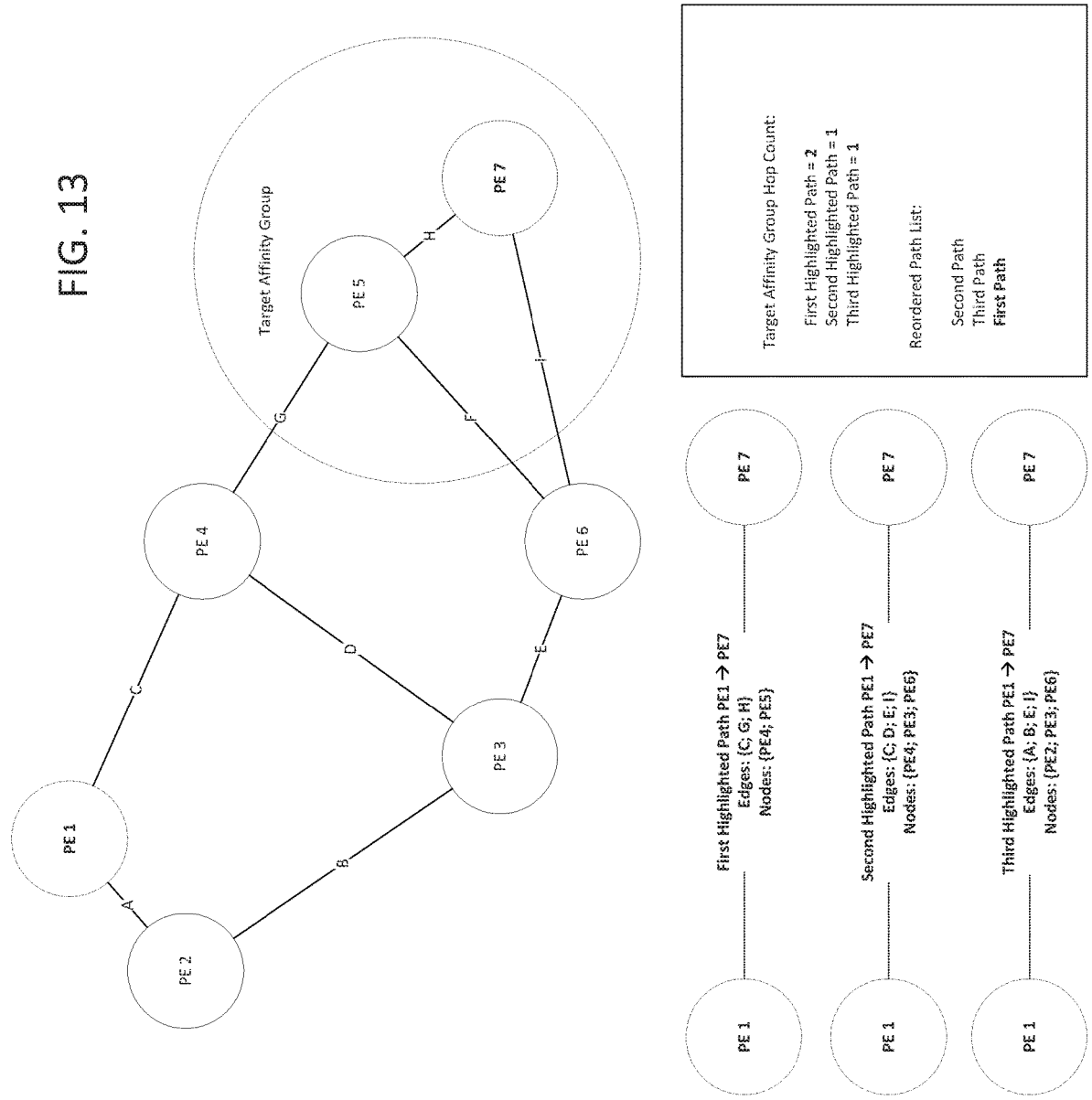
FIG. 13 illustrates a scenario in implementing a Target Affinity Group Metric Ordering Routine according to an exemplary embodiment of the invention.

Target Affinity Group Metric Ordering Routine (Optional, Override):

As illustrated in FIG. 13, Target Affinity Group metric overrides diversity index values (overrides Diversity Ordering Routine), previous-next path relationship is broken but if diverse paths have been selected, they will still be diverse. The path list gets reordered ascending by Target Affinity Group hop count (number of traversed nodes belonging to the Target Affinity Group).

Discard Unusable Pruning Routine (Optional):

This routine is usually run when the modeling process has been reviewed. As illustrated in FIG. 14, it prunes all paths that have been marked as "Unusable" for any given reason. This gives a clean ranked path list as output, ready to be deployed on the network.

Exit Point Role Ordering Routine (Optional):

This routine is usually run when the network does not quite follow the model for some reason and the ranked list of paths is wrongly ordered in terms of Exit Point Roles (i.e. a Secondary Path is shown before a Primary Path, as shown in FIG. 15. This does not usually happen unless the network is non-compliant with the model, for example, during a planned topology change).

Extra Routines for Data Richness:

Additional routines or steps may be added to the process in order to compute and display useful information to the user—for example, node and route utilization statistics, current node bandwidth demands, etc. Reporting and forecasting features may also be included.

The system preferably includes a GUI (Graphical User Interface) to present the user with a visual diagram of the C-TED graph, C-TED tables and tools to parameterize the underlying algorithms, calculated paths are also shown on the diagram as well as the configuration generated for each set of paths. The system can provide the user with information on all paths configured on the network regardless of the method or system that was originally used to create or define them. Again, FIG. 5 shows an example output diagram to be displayed on the GUI.

As part of the planning and modeling features, the system also includes functionality to allow a user to add, edit or remove/exclude links and/or nodes from the C-TED offline, specify their TE properties and use them as part of the aforementioned calculations.

The information generated by the above-described system and during the above process and made available by the API may also be exposed through an API or other means to make it available to be consumed by applications for internal or customer use, for example on a customer portal. Such information may be useful for various other applications including network operations control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

The invention claimed is:

1. A method for managing one or more class levels of service to a communication network comprising a plurality of network devices, said method comprising:

retrieving, by a network management apparatus, network information of the plurality of network devices in the communication network;

generating a customizable traffic engineering database based on the retrieved network information;

receiving a user input of path computation parameters;

generating a network path list comprising a list of all possible paths for the plurality of network devices;

tailoring the network path list by selecting a first set of paths from the list of all possible paths for a first class of network traffic in accordance with a network model and business rules, selecting a second set of paths from the list of all possible paths for a second class of network traffic, and selecting a third set of paths from the list of all possible paths for a third class of network traffic;

generating path configuration information based on the first set of paths, the second set of paths, and the third set of paths;

transmitting the path configuration information to one or more of the plurality of network devices in the communication network, the one or more network devices applying the path configuration information, wherein network traffic from the second class of network traffic and network traffic from the third class of network traffic is never transmitted over the first set of paths.

2. The method of claim 1, wherein the network information includes link state, traffic engineering, performance, and traffic statistics for the communication network.

3. The method of claim 1, wherein the path computation parameters are constrained by the network model.

4. The method of claim 3, wherein the path computation parameters are further constrained by business rules.

5. The method of claim 4, wherein the network model and business rules are based on traffic engineering information.

6. The method of claim 3, wherein the network model includes one or more of bandwidth, packet loss, delay, and affinity group.

7. The method of claim 4, wherein the business rules include one or more of monetary cost, reliability, and exit points.

8. The method of claim 1, wherein the path configuration information corresponds to all possible paths for the plurality of network devices.

9. The method of claim 1, wherein the path configuration information includes one or more of a host name, networking groups, and cable systems.

10. The method of claim 1, wherein the tailoring of the network path list includes providing information to a user to approve or reject any optimizations included in the tailored network path list.

11. A method for managing one or more class levels of service to a communication network comprising a plurality of network devices, said method comprising:
   retrieving, by a network management apparatus, network information of the plurality of network devices in the communication network;
   generating a customizable traffic engineering database based on the retrieved network information;
   receiving a user input of path computation parameters;
   generating a network path list comprising a list of all possible paths for the plural network devices;
   tailoring the network path list by
      selecting a first set of paths from the list of all possible paths for a first class of network traffic in accordance with a network model and business rules,
      selecting a second set of paths from the list of all possible paths for a second class of network traffic, and
      selecting a third set of paths from the list of all possible paths for a third class of network traffic;
   generating path configuration information based on first set of paths, second set of paths, and third set of paths;
   transmitting the path configuration information to one or more of the plurality of network devices in the communication network, the one or more network devices applying the path configuration information,
   generating an external service model comprising a plurality of exit points for connecting to points of presence of the communication network corresponding to the path configuration information;
   interconnecting the communication network with one or more other communication networks on the one or more class levels of services through the plurality of exit points;
   wherein network traffic from the second class of network traffic and network traffic from the third class of network traffic is never transmitted over the first set of paths.

12. The method of claim 11, wherein the business rules comprise a business model and a service model,
   wherein the business rules are presented as an abstraction of the business rules which make up a collection of service identity objects, each service identity object representing the abstraction to a customer service instance.

* * * * *